(12) United States Patent
Tanaka et al.

(10) Patent No.: US 9,083,620 B2
(45) Date of Patent: Jul. 14, 2015

(54) NETWORK GROUP MANAGEMENT SYSTEM

(75) Inventors: Ryuta Tanaka, Kawasaki (JP); Takashi Hamano, Kawasaki (JP); Atsuko Tada, Kawsaki (JP); Jouji Uemura, Osaka (JP); Futoshi Nakamori, Osaka (JP)

(73) Assignee: FUJITSU LIMITED, Kawasaki (JP)

(*) Notice: Subject to any disclaimer, the term of this patent is extended or adjusted under 35 U.S.C. 154(b) by 1327 days.

(21) Appl. No.: 12/480,922

(22) Filed: Jun. 9, 2009

(65) Prior Publication Data

US 2010/0042713 A1 Feb. 18, 2010

(30) Foreign Application Priority Data

Aug. 18, 2008 (JP) .................................. 2008-209949

(51) Int. Cl.
| | | |
|---|---|---|
| *G06F 15/173* | (2006.01) | |
| *H04L 12/26* | (2006.01) | |
| *H04L 12/911* | (2013.01) | |
| *H04L 12/24* | (2006.01) | |

(52) U.S. Cl.
CPC ........ *H04L 43/0882* (2013.01); *H04L 41/0893* (2013.01); *H04L 41/0896* (2013.01); *H04L 47/783* (2013.01)

(58) Field of Classification Search
CPC .................................................... H04L 47/783
USPC ......................................................... 709/226
See application file for complete search history.

(56) References Cited

U.S. PATENT DOCUMENTS

| | | | | |
|---|---|---|---|---|
| 5,121,383 | A * | 6/1992 | Golestani ...................... | 370/235 |
| 6,330,609 | B1 * | 12/2001 | Garofalakis et al. .......... | 709/229 |
| 6,760,774 | B1 * | 7/2004 | Soumiya et al. ............... | 709/233 |
| 6,826,612 | B1 * | 11/2004 | Bosloy et al. ................. | 709/227 |
| 7,774,468 | B1 * | 8/2010 | Nag et al. ...................... | 709/226 |
| 2002/0080816 | A1 * | 6/2002 | Spinar et al. .................. | 370/449 |
| 2002/0103924 | A1 * | 8/2002 | Nomura ........................ | 709/235 |
| 2004/0044770 | A1 * | 3/2004 | Messick et al. ............... | 709/226 |
| 2004/0228278 | A1 * | 11/2004 | Bruckman et al. ............ | 370/231 |

(Continued)

FOREIGN PATENT DOCUMENTS

| | | |
|---|---|---|
| JP | 2004-199578 | 7/2004 |
| JP | 2004-318274 | 11/2004 |
| JP | 2006-227763 | 8/2006 |

OTHER PUBLICATIONS

Yoshitaka Uchida, et al. "P2P System "AmorphicNet" with Dynamic Creation and Arrangement of Index Servers", FIT (Forum of Information Science Technology), 2002.

*Primary Examiner* — Imad Hussain
(74) *Attorney, Agent, or Firm* — Katten Muchin Rosenman LLP

(57) ABSTRACT

As a result of performing a comparing and determining process of determining the relationship among the bandwidth of distributed data in real time in a local group, the incoming data bandwidth to the local group, and the outgoing data bandwidth from the local group, the increase/decrease management and the connection management of each terminal device in the local group are performed. The comparing and determining process compares, for example, a sum of the total sum of the terminal possessed transfer bandwidths and the incoming data bandwidth from other groups to the local group with a sum of the value obtained by multiplying the bandwidth of distributed data in the local group by the number of terminal devices in the local group, the outgoing data bandwidth from the local group, and a predetermined determination margin.

10 Claims, 36 Drawing Sheets

(56) References Cited

U.S. PATENT DOCUMENTS

| | | | |
|---|---|---|---|
| 2006/0094440 A1* | 5/2006 | Meier et al. ................... 455/453 |
| 2009/0141731 A1* | 6/2009 | Bitar .............................. 370/412 |
| 2012/0147743 A1* | 6/2012 | Singh et al. ................... 370/230 |
| 2013/0128887 A1* | 5/2013 | Shah .............................. 370/390 |

* cited by examiner

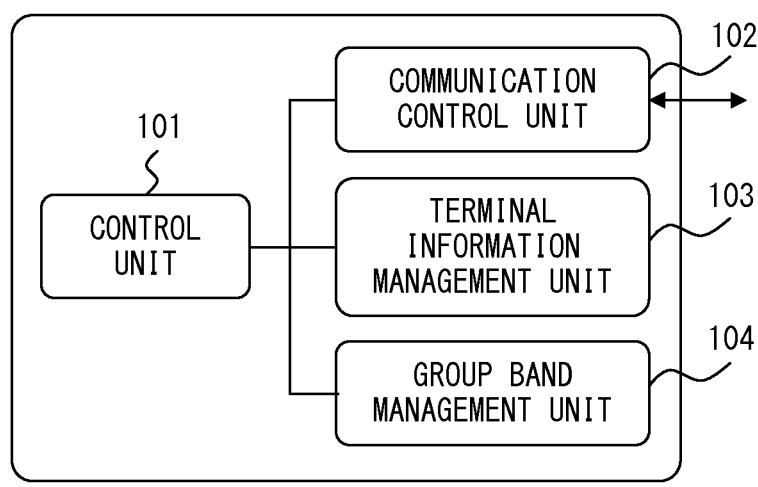
F I G. 1

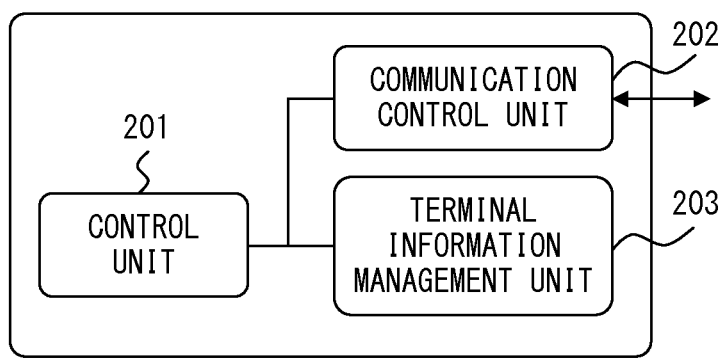
F I G. 2

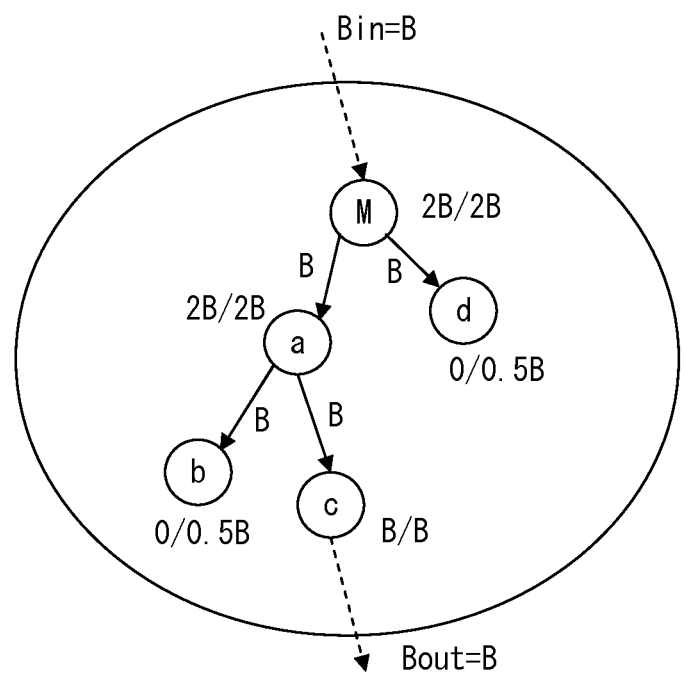
F I G. 3

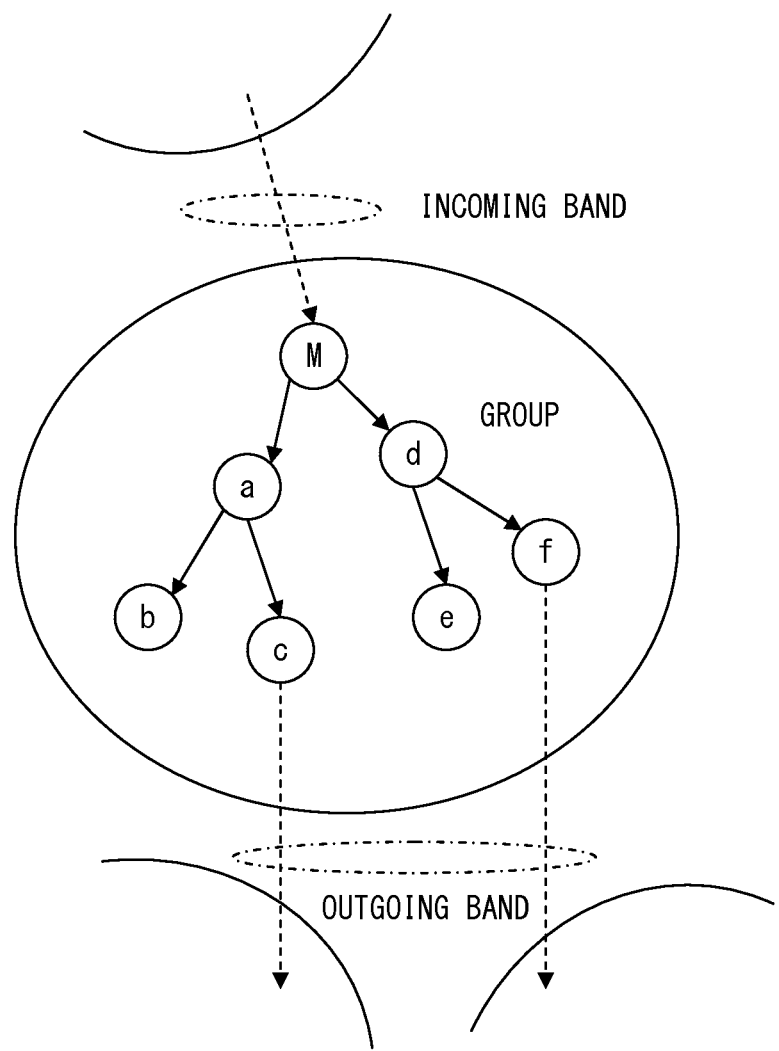
F I G. 4

EXAMPLE OF TERMINAL INFORMATION MANAGEMENT TABLE IN THE FIRST EMBODIMENT

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| 192.168.10.5:10000 | 1 | 2 | 10 | UP=192.xx.~,GID=10<br>LW=192.xx.~,GID=10 | COMMON | |
| 192.168.11.100:10050 | 3 | 3 | 10 | UP=192.xx.~,GID=10<br>LW=192.xx.~,GID=10<br>LW=192.xx.~,GID=10<br>LW=192.xx.~,GID=10 | MANAGEMENT TERMINAL | |
| ... | | | | | | |
| 192.168.30.10:20000 | - | - | 15 | | MANAGEMENT TERMINAL | |
| 192.168.10.3:10100 | 0 | 5 | 10 | UP=192.xx.~,GID=10 | COMMON | |

F I G. 5

EXAMPLE OF TERMINAL INFORMATION MANAGEMENT TABLE IN THE FIRST EMBODIMENT

| ITEM | VALUE |
|---|---|
| TOTAL BAND | 25 |
| INCOMING BAND | 1 |
| OUTGOING BAND | 2 |
| MARGIN | 5 |
| GROUP STATE | "STABLE" |
| CONTENTS BAND | 3Mbps |

FIG. 6

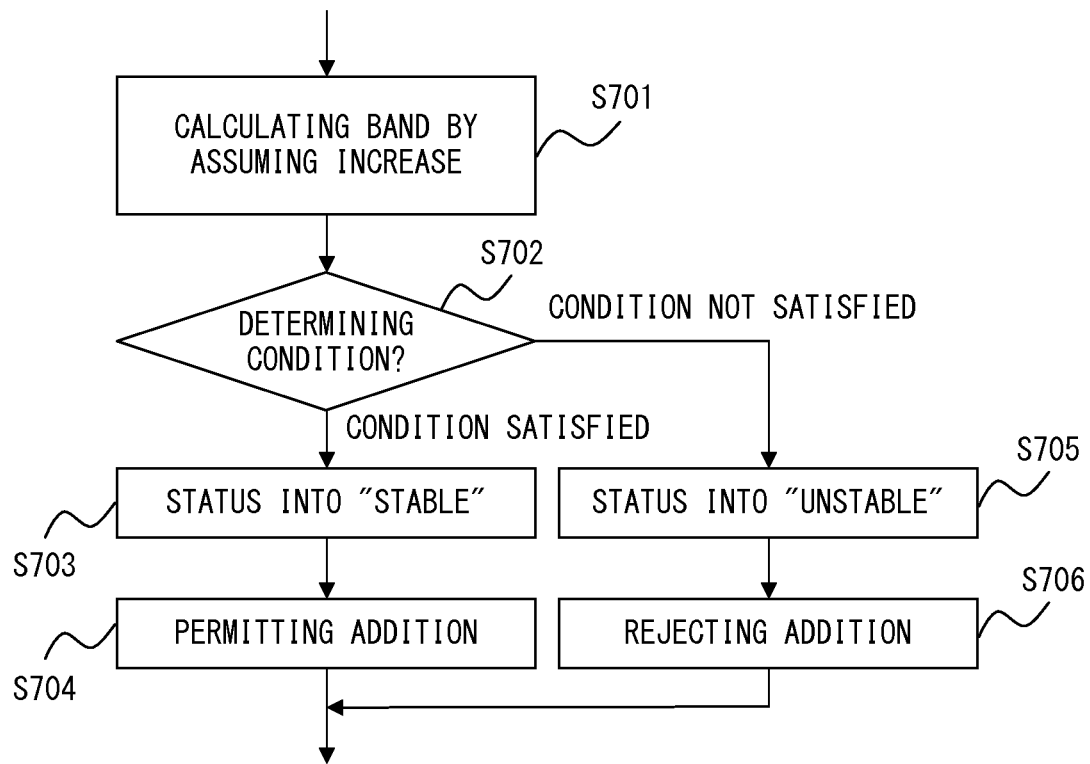
F I G. 7

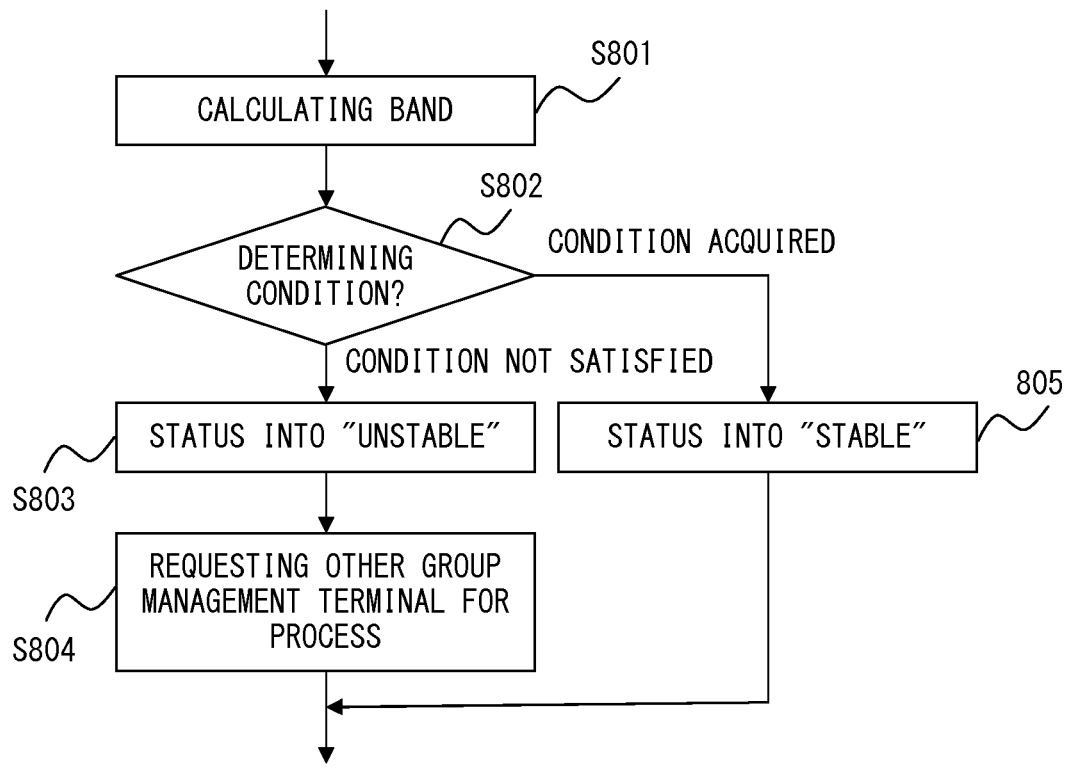
F I G. 8

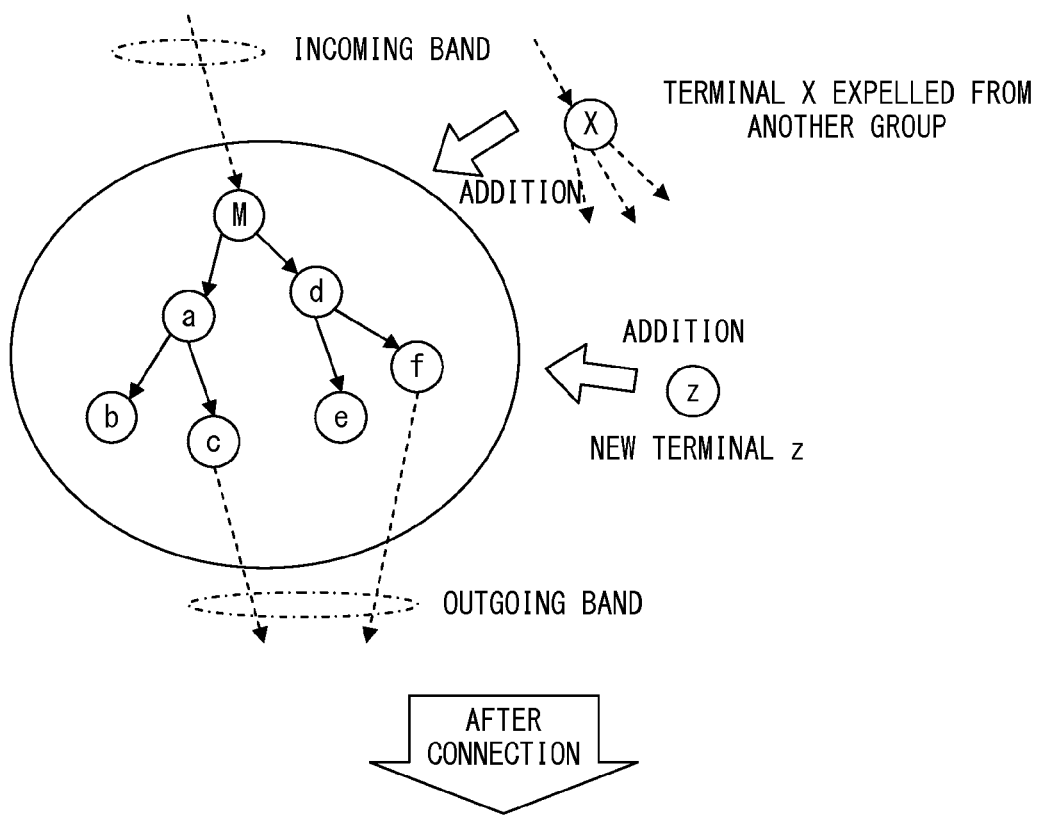
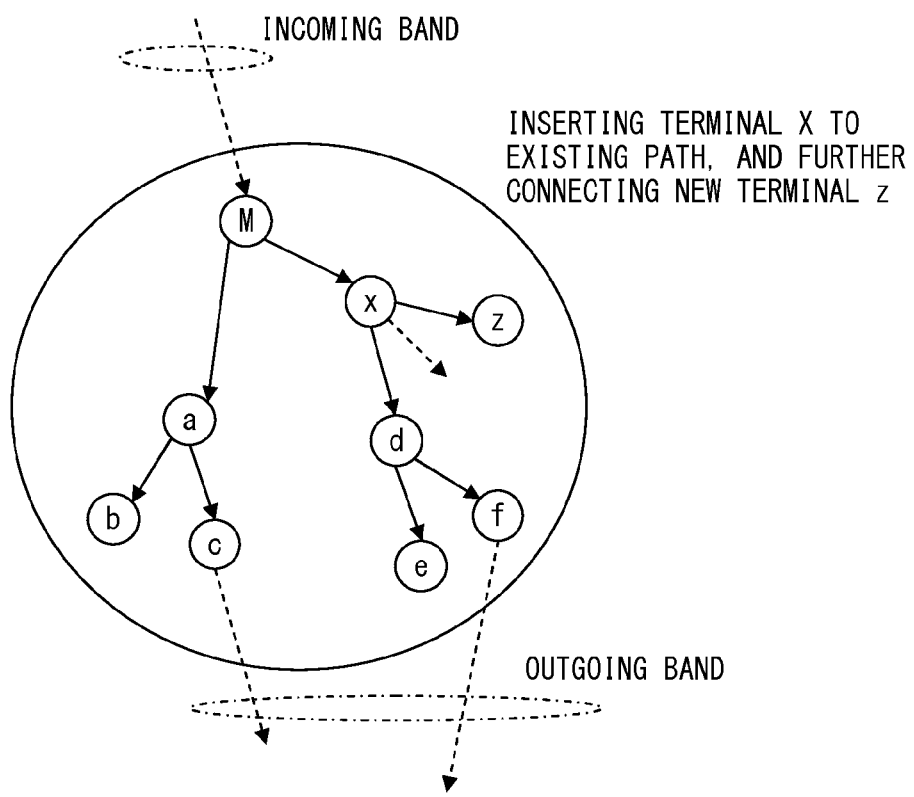
FIG. 10

(BEFORE CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (M) | 2 | 2 | 10 | UP=192.xx.~, GID=3<br>LW=(a), GID=10<br>LW=(d), GID=10 | MANAGEMENT TERMINAL | |
| (d) | 2 | 2 | 10 | UP=(M), GID=10<br>LW=(e), GID=10<br>LW=(f), GID=10 | COMMON TERMINAL | |
| ... | | | | | | |

(AFTER CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (M) | 2 | 2 | 10 | UP=192.xx.~, GID=3<br>LW=(a), GID=10<br>LW=(X), GID=10 | MANAGEMENT TERMINAL | |
| (d) | 2 | 2 | 10 | UP=(X), GID=10<br>LW=(e), GID=10<br>LW=(f), GID=10 | COMMON TERMINAL | |
| (X) | 2 | 3 | 10 | UP=(M), GID=10<br>LW=(d), GID=10<br>LW=(z), GID=10 | COMMON TERMINAL | |
| (z) | 0 | 0 | 10 | UP=(X), GID=10 | COMMON TERMINAL | |
| ... | | | | | | |

FIG. 11

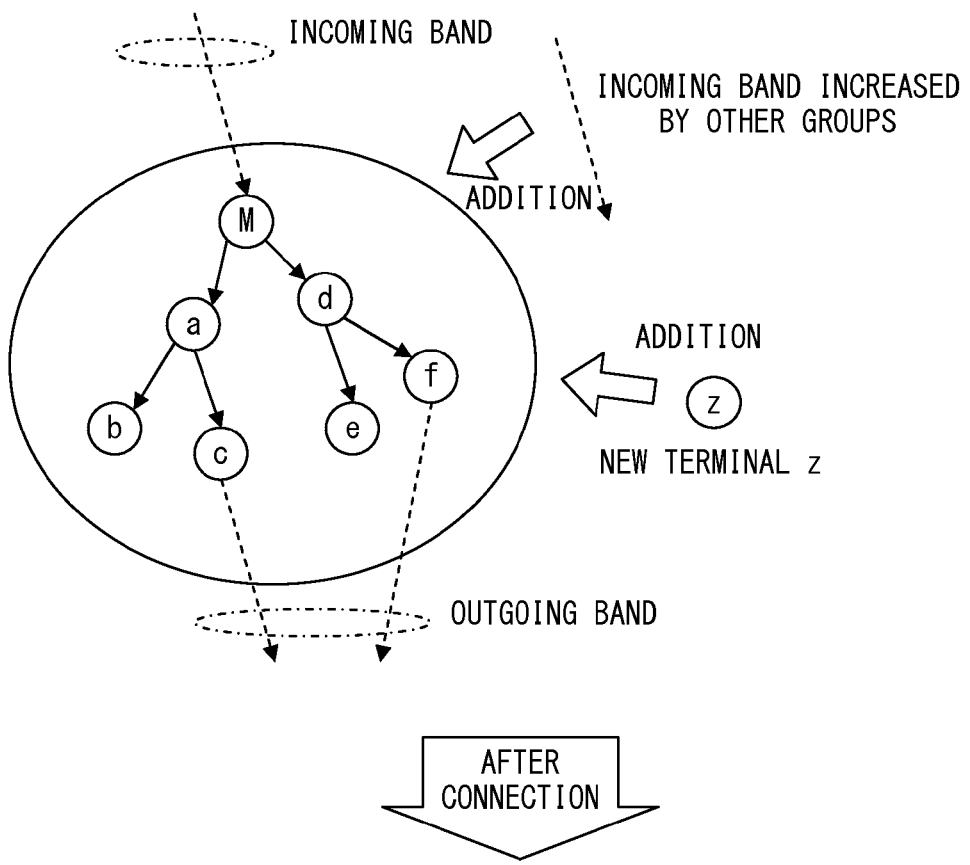
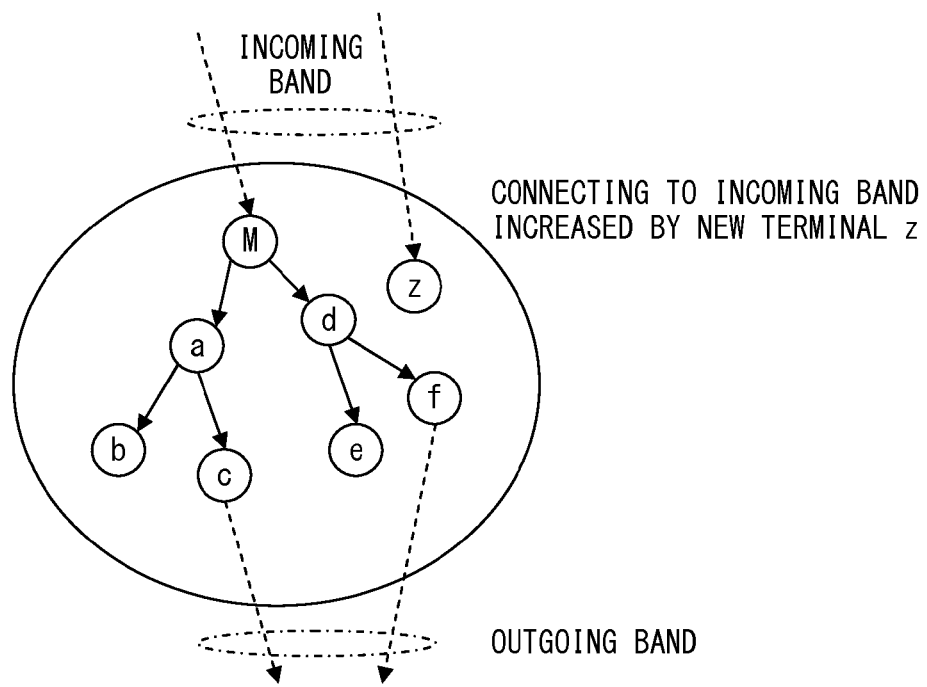
FIG. 12

(BEFORE CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| ... | | | | | | |
| ... | | | | | | |

(AFTER CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| ... | | | | | | |
| ... | | | | | | |
| (z) | 0 | 0 | 10 | UP=192.xx~, GID = 3 | | |

FIG. 13

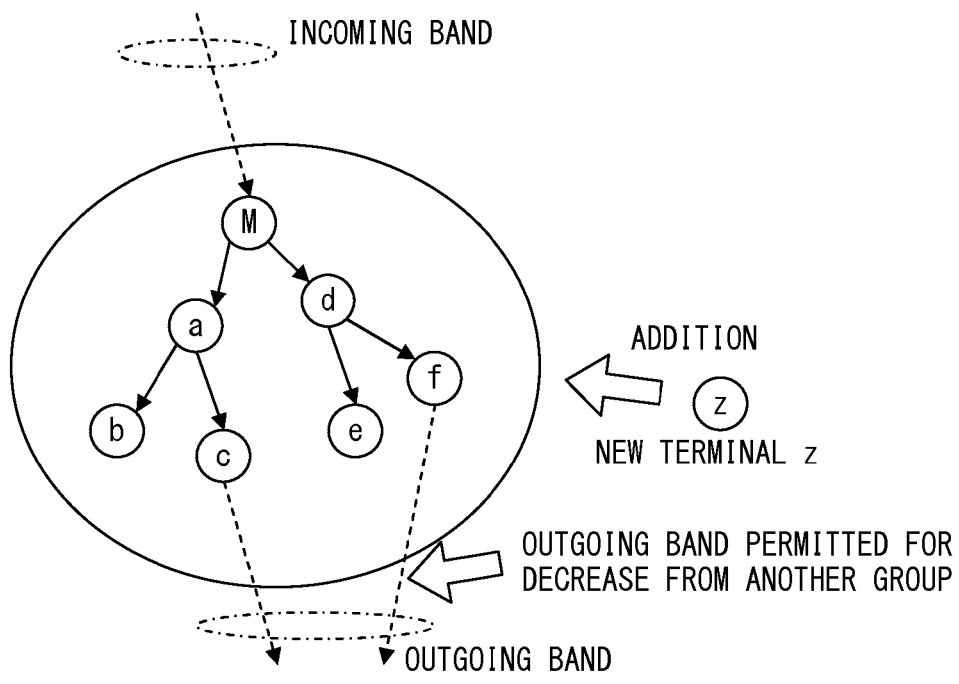
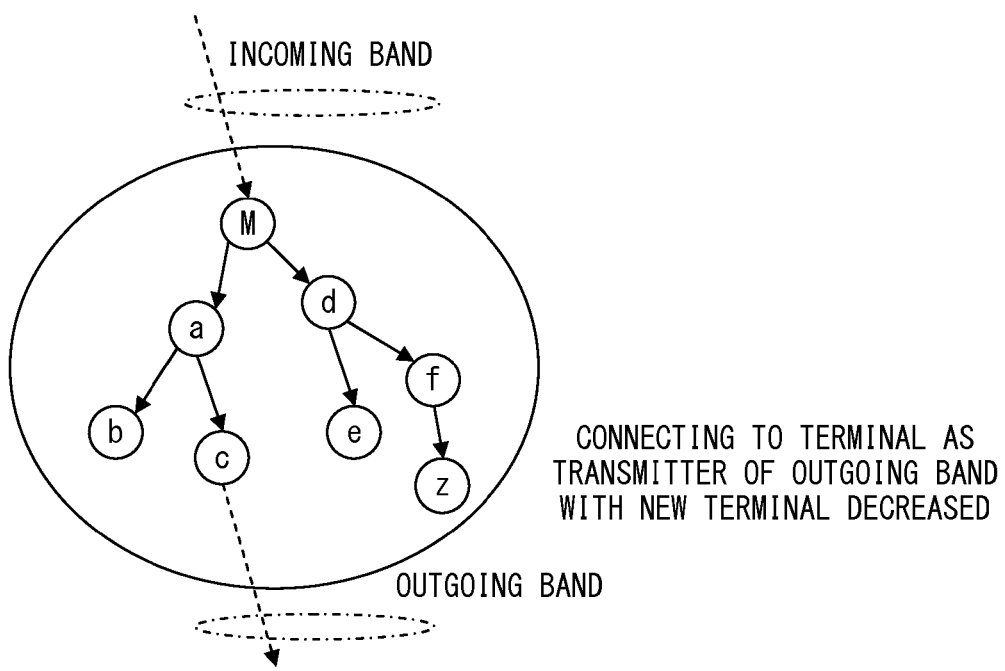
FIG. 14

(BEFORE CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (f) | 1 | 1 | 10 | UP=(d), GID = 10<br>LW=192.xx~, GID = 15 | | |
| ... | | | | | | |

(AFTER CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (f) | 1 | 1 | 10 | UP=(d), GID = 10<br>LW=(z), GID = 10 | | |
| ... | | | | | | |
| (z) | 0 | 0 | 10 | UP=(f), GID = 10 | | |

FIG. 15

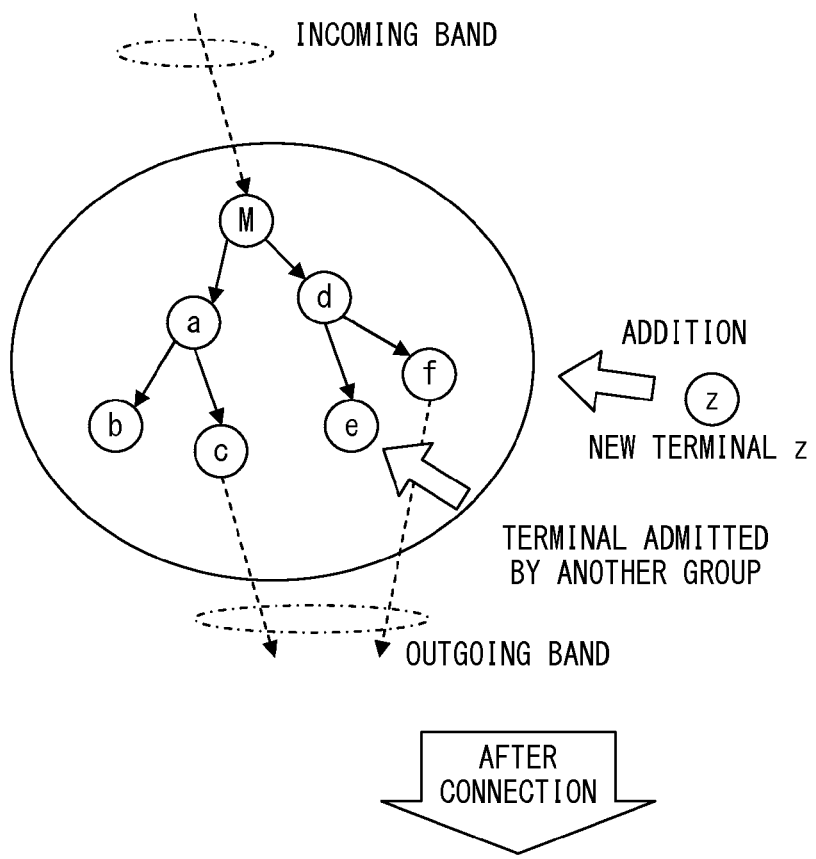
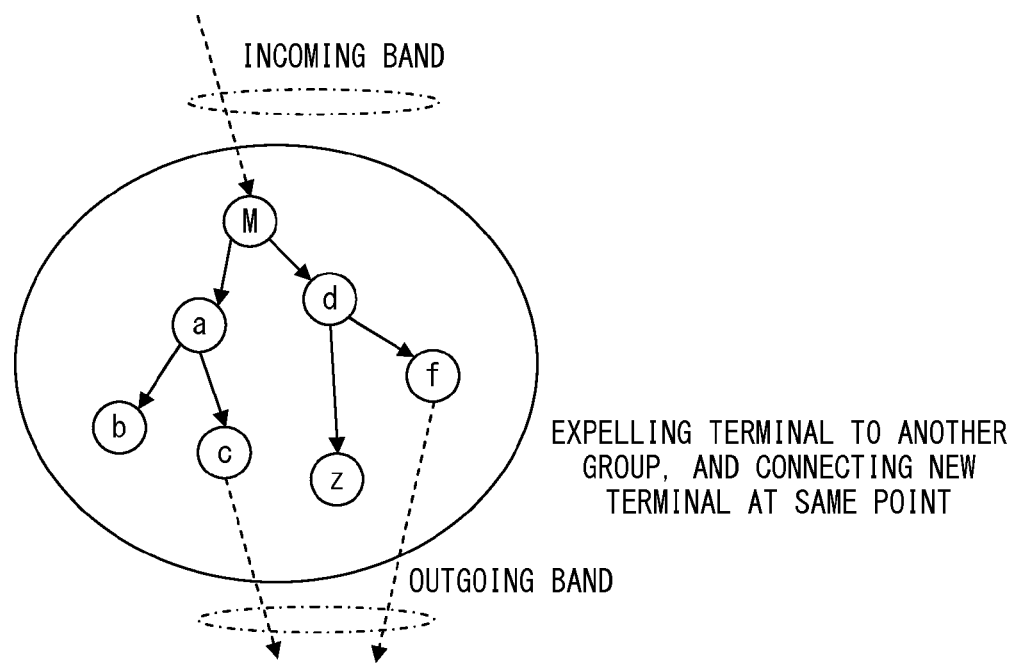
FIG. 16

(BEFORE CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (d) | 0 | 0 | 10 | UP=(M), GID = 10<br>LW=(e), GID = 10<br>LW=(f), GID = 10 | | |
| (e) | 0 | 0 | 10 | UP=(d), GID = 10 | | |
| ... | | | | | | |

(AFTER CONNECTION)

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| (d) | 0 | 0 | 10 | UP=(M), GID = 10<br>LW=(z), GID = 10<br>LW=(f), GID = 10 | | |
| ... | | | | | | |
| (z) | 0 | 0 | 10 | UP=(d), GID = 10 | | |

FIG. 17

EXAMPLE OF CONNECTION REQUEST
PACKET FORMAT

| MsgTYPE=JoinReq |
| Sender info(IPadrs,port) |
| Sender info2(spec) |

F I G. 1 8

EXAMPLE OF CONNECTION REPLY
PACKET FORMAT

| MsgTYPE=JoinRepl |
| --- |
| Sender info(IPadrs,port) |
| Sender info2(spec) |
| GourpID |
| UpNode info(IPadrs,port) |
| LwNode info(IPadrs,port) |

F I G. 19

EXAMPLE OF TERMINAL EXPEL
REQUEST PACKET FORMAT

| MsgTYPE=MoveReq |
| Sender info(IPadrs,port) |
| GroupID |
| ReqSpec |

F I G. 2 0

EXAMPLE OF TERMINAL EXPEL
REQUEST REPLY PACKET FORMAT

| |
|---|
| MsgTYPE=MoveRepl |
| Sender info(IP,port) |
| Sender info2(spec) |
| GroupID |
| Ans (OK/NG) |
| Node1 info(IPadrs,port) |
| Node2 info(IPadrs,port) |
| |

FIG. 21

EXAMPLE OF INCOMING BAND
INCREASE REQUEST PACKET FORMAT

| |
|---|
| MsgTYPE=SupportReq |
| Sender info(IP,port) |
| Sender info2(spec) |
| GroupID |
| ReqSpec |

F I G. 2 2

EXAMPLE OF INCOMING BAND
INCREASE REQUEST REPLY PACKET
FORMAT

| MsgTYPE=SupportRepl |
| Sender info(IP,port) |
| Sender info2(spec) |
| GroupID |
| Ans (OK/NG) |
| Node info(IPadrs,port) |

FIG. 23

EXAMPLE OF OUTGOING BAND
DECREASE NOTIFICATION PACKET
FORMAT

| |
|---|
| MsgTYPE=ReduceNotice |
| Sender info(IP,port) |
| Sender info2(spec) |
| GroupID |
| Node1 info(IPadrs,port) |
| Node1 spec |

F I G. 2 4

EXAMPLE OF OUTGOING BAND
DECREASE NOTIFICATION REPLY
PACKET FORMAT

| |
|---|
| MsgTYPE=ReduceRepl |
| Sender info(IP,port) |
| Sender info2(spec) |
| GroupID |
| Ans=OK/NG |

F I G. 2 5

EXAMPLE OF TERMINAL ACCEPT
REQUEST PACKET FORMAT

| MsgTYPE=RecvReq |
| --- |
| Sender info(IP,port) |
| Sender info2(spec) |
| GroupID |
| Node1 info |
| Node1 spec |

F I G. 2 6

EXAMPLE OF TERMINAL ACCEPT
REQUEST REPLY PACKET FORMAT

| |
|---|
| MsgTYPE=RecvRepl |
| Sender info(IP,port) |
| Sender info2(spec) |
| GroupID |
| Node1 = OK/NG |

F I G. 2 7

EXAMPLE OF TERMINAL INFORMATION MANAGEMENT TABLE ACCORDING TO SECOND EMBODIMENT

| TERMINAL | BAND IN USE | AVAILABLE POSSESSED BAND | RELATED GROUP ID | CONNECTED TERMINAL | TERMINAL TYPE | MARKER |
|---|---|---|---|---|---|---|
| 192.168.10.5:10000 | 2 | 5 | 10 | UP1=192.xx.~,GID=10<br>LW1=192.xx.~,GID=10<br>UP2=192.xx~,GID=10<br>LW2=192.xx~,GID=10 | COMMON TERMINAL | |
| 192.168.11.100:10050 | 3 | 3 | 10 | UP1=192.xx.~,GID=10<br>LW1=192.xx.~,GID=10<br>UP2=192.xx~,GID=10<br>LW2=192.xx.~,GID=10<br>LW2=192.xx.~,GID=10 | MANAGEMENT TERMINAL | |
| ... | | | | | | |

F I G. 3 4

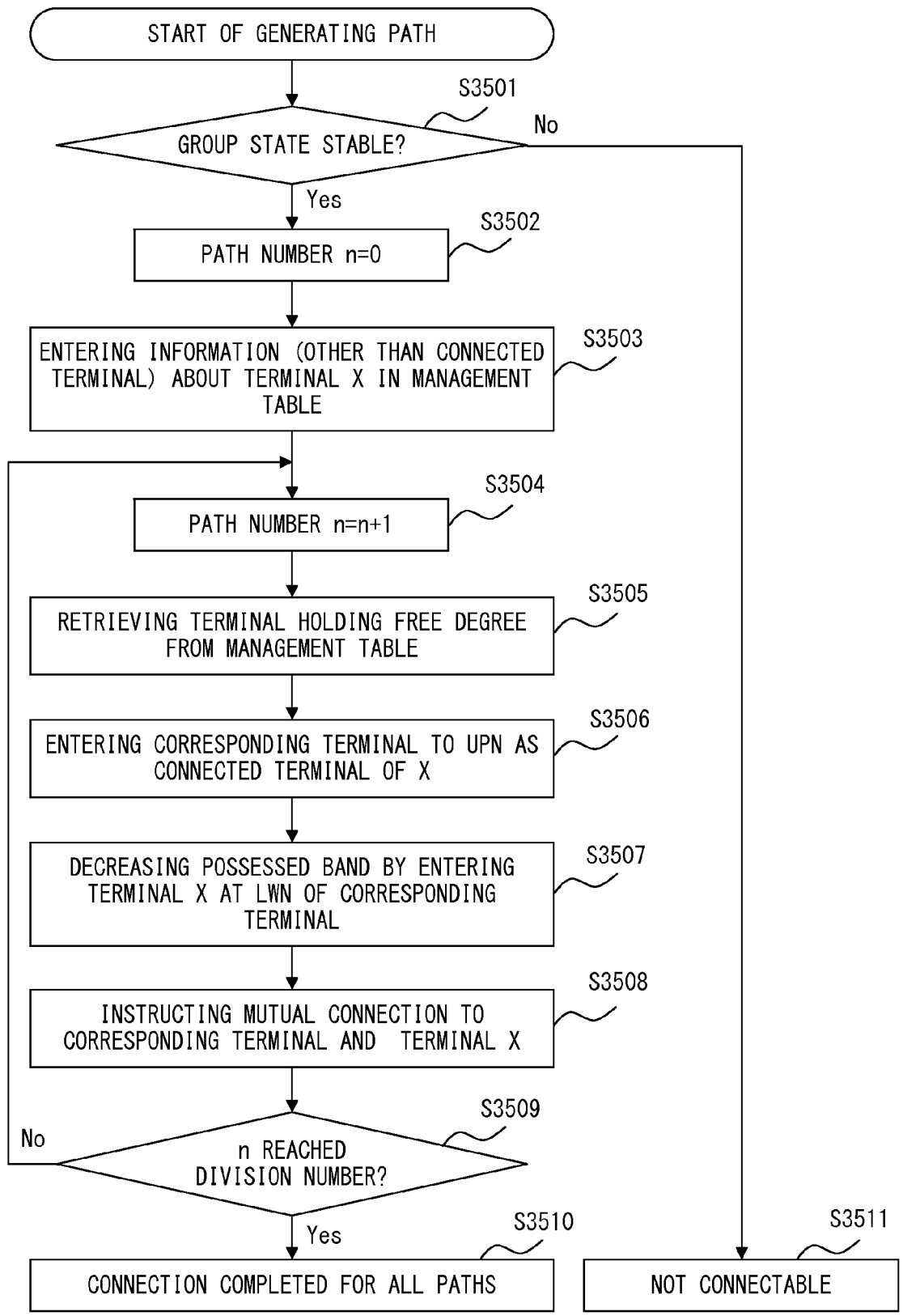
F I G. 35

NETWORK GROUP MANAGEMENT SYSTEM

CROSS-REFERENCE TO RELATED APPLICATION

This application is based upon and claims the benefit of priority of the prior Japanese Patent Application No. 2008-209949, filed on Aug. 18, 2008, the entire contents of which are incorporated herein by reference.

FIELD

The present invention relates to the streaming distribution technology for peer-to-peer (hereinafter referred to as P2P) connecting a plurality of terminal devices and distributing data in real time by the relay transfer of data.

BACKGROUND

When the number of data receiving terminals increases in the conventional client-server data distribution system, a distribution load occurs correspondingly in the distribution server. Therefore, a large system requires the reinforcement of the distribution servers where access concentrates and network infrastructure, thereby causing the problem of a higher distribution cost.

With the background above, the distribution performed by applying the P2P technology has recently been highly regarded. As a P2P streaming distribution method, there is a method in which a terminal that has received data relays the received data to another terminal, the data is sequentially relay-distributed from terminal to terminal, thereby realizing a distribution on a large scale and generating a moderate of no increase of the distribution load of the distribution server in response to an increasing number of terminals.

A P2P distribution can be regarded as a data distribution on a logic network (overlay network) formed by a logic link between terminals.

On the other hand, grasping and managing the information about terminals configuring the P2P network in the P2P data distribution is very important from the viewpoints of security, accounting in a commercial service, etc. The terminals can be managed in the system of providing a dedicated server (terminal management server) for centrally managing them. However, in a large system having a large number of terminals, the information access concentrates on the terminal management server, which is the bottleneck and causes degraded scalability.

A common system for reducing the load of the management of the terminal information above is to group the terminals and provide the terminal management server for each group, and manage the information by the group. When the number of terminal increases, the number of terminals in a group can be suppressed by increasing the number of groups. Therefore, the terminal management server of each group can reduce the growth of a management load.

In this case, it is desired that the relay transfer of data can be performed between the terminals in the same group because the effect of the communication traffic between the terminals on a physical network can be reduced when the relay transfer is performed between the same group with a physical network configuration designed to group the terminals close to one another on the network.

The patent document 1 discloses the conventional technology of grouping terminals in a P2P relay distribution and establishing a distribution path in a group.

The conventional technology is data relay type contents distribution technology for grouping terminals for relay transferring data, and dispersing the load of a server, thereby improving the band use efficiency of each terminal including the server.

In the grouping process, one group is formed by collecting terminals close to one another in data transfer band, and generating a path of a daisy chain in the group with a terminal having a wide band determined as an upstream terminal. Thus, data is distributed.

When a terminal on a distribution path deviates from the relay distribution in a daisy chain due to a fault etc., a terminal upstream to the faulty terminal detects the fault and amends the path to skip the deviating terminal and transfer the data to the downstream terminals, thereby maintaining the distribution.

In the grouping process by another conventional technology disclosed in the following patent document 2, relay terminals are arranged in the descending order from the terminal having the widest transfer bandwidth in the contents distribution similar to the distribution by the above-mentioned conventional technology, the groups are assigned from the first group to the Nth group, and then inversely assigned from the Nth group to the first group, and the processes are repeated, thereby configuring the groups to average the performance and the numbers of the member terminals in each group.

Also in this system, the distribution path in a group is a daisy chain, and the relay can be maintained by skipping a faulty terminal when a fault occurs, thereby easily amending the path.

[Patent Document 1] Japanese Laid-open Patent Publication No. 2004-318274

[Patent Document 2] Japanese Laid-open Patent Publication No. 2004-199578

The two above-mentioned conventional technologies (patent documents 1 and 2) are terminal management systems for improving the scalability by grouping and managing terminals. The grouping processes in the conventional technologies are optimized to obtain an effect of shortening the download time in the download and distribution system in which the relay distribution in a group is performed through one relay path in a daisy chain. When a relay terminal is stopped, the stopped terminal is skipped, thereby successfully continuing the distribution.

On the other hand, the data distribution speed is constant in many cases in the streaming distribution in which the distribution efficiency is attained by increasing the number of broadcast terminals, not by shortening the distribution time.

Therefore, the distribution path in a group is not a daisy chain, but a tree-shaped or a mesh-shaped path, and a terminal having a wide transfer bandwidth simultaneously relay-transfers data to a plurality of terminals.

FIG. 36 illustrates an example of a distribution path for one group as a part of the P2P distribution system in which each terminal is connected through a tree-shaped distribution path and data is relay-distributed through the path. When terminals are grouped in the streaming distribution through the above-mentioned distribution path, there occurs a problem in grouping the terminals with the above-mentioned conventional technologies applied as is.

In FIG. 36, each terminal is illustrated as a circle, and the status of each terminal is represented by the numerals accompanying the circles indicating the "band in use/possessed band". For example, the terminal a has the possessed band (corresponding to the band/bandwidth available to and possessed by terminal a) of 2B which is exactly double the bandwidth of distributed data B, and uses 2B because the received distributed data is copied inside and relayed to the terminals b and c. Therefore, the terminal is indicated by [2B/2B].

In FIG. 36, it is apparent that all terminals have used the possessed bands

In the above-mentioned conventional technologies, a group is configured by terminals having possessed bands close to one another, or by terminals such that the possessed bands of each group are assigned evenly. If a tree-shaped or mesh-shaped path is designed in a group, there is no sufficient room for the transfer band in the group as illustrated in FIG. 36.

At this time, if a terminal (terminal a illustrated in FIG. 36) relaying two or more terminals goes down for any reason, one of the terminals b and c immediately below the terminal M that has lost the distribution destination and has therefore reduced bandwidth in use can receive data by maintaining the connection, but the other has no terminal capable of transferring data in the group, loses the distribution source, and cannot continue to receive data.

In this case, the distribution path can be amended by a search for a terminal that can be a distribution source in another group. However, amending a connection path using labor and time in a communication sequence with another group after detecting a path disconnection (reception stop) state is not desired because it stops video and audio in the real time streaming distribution.

As described above, there is the problem with the conventional technologies that a path cannot be repaired in the group.

SUMMARY

The aspect described below is based on the network group management system in a streaming distribution system for grouping terminal devices and performing a real time data transfer among the terminal devices.

A group management terminal device etc. for grouping and managing terminal devices has the following configuration. A communication control device (102) collects from each terminal device the terminal information including a data transfer band about each terminal device in the local group.

A terminal information management device (103) holds the collected terminal information.

A group band management device (104) holds the total information about the data transmission band held by each terminal device in the local group according to the collected terminal information.

A control device (101) performs increase/decrease management and connection management for each terminal device in the local group by performing a comparing and determining process for determining the relationship among the band of distributed data in real time in the local group, the incoming data band for the local group, and the outgoing data band from the local group according to the terminal information held by the terminal information management device and the total information about the data transmission band held by the group band management device. The comparing and determining process is to compare, for example, the sum of the total sum of the transfer bandwidths of terminals and the incoming data band from another group to the local group with the sum of the value obtained by multiplying the bandwidth of distributed data in the local group by the number of terminal devices in the local group and the sum of the outgoing data bandwidths from the local group and the predetermined determining margin. The control device performs the comparing and determining process by, for example, considering the information about the terminal device to be added to the local group, and determines whether or not the terminal device to be added to the local group is permitted to be added to the local group on the basis of the result of the performance of the process. In addition, if the control device determines that each terminal device is not permitted to be increased/decreased in or connected to the local group as the result of the comparing and determining process, then a terminal move request is transmitted to another group to perform a control process for moving a terminal device between the local group and another group. Furthermore, for example, when the control device determines as a result of the comparing and determining process that each terminal device is not permitted to be increased or decreased or connected in the local group, a data transmission support request or a data transmission decrease notification is transmitted to another group, thereby performing the process of controlling the amount of incoming data or the amount of outgoing data to the local group. Additionally, when the control device receives a terminal move request from another group, a data transmission support request, or a data transmission decrease notification, the device performs the comparing and determining process by considering the information about the request or the notification, and determines whether or not the request or the notification is accepted on the basis of the result of the performance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 illustrates the basic configuration of the group management terminal according to the first and second embodiments;

FIG. 2 illustrates the basic configuration of the common terminal according to the first and second embodiments;

FIG. 3 is an example of a distribution path by a tree-shaped path;

FIG. 4 is an explanatory view of each definition of an incoming band and an outgoing band;

FIG. 5 is an example of the configuration of the terminal information management table held by the terminal information management unit;

FIG. 6 is an example of the configuration of the group band management table held by the group band management unit;

FIG. 7 is a flowchart of the operation in the terminal addition determining process;

FIG. 8 is a flowchart of the operation in the band change determining process;

FIG. 10 is an explanatory view of an example of configuring a path accompanying a terminal expel request;

FIG. 11 is an explanatory view of a change of a terminal information management table accompanying the terminal expel request illustrated in FIG. 10;

FIG. 12 is an explanatory view of an example of configuring a path accompanying an incoming band increase request;

FIG. 13 is an explanatory view of a change of a terminal information management table accompanying the incoming band increase request illustrated in FIG. 12;

FIG. 14 is an explanatory view of an example of configuring a path accompanying an outgoing band decrease notification;

FIG. 15 is an explanatory view of a change of a terminal information management table accompanying the outgoing band decrease notification illustrated in FIG. 14;

FIG. 16 is an explanatory view of an example of configuring a path accompanying a terminal accept request;

FIG. 17 is an explanatory view of a change of a terminal information management table accompanying the terminal accept request illustrated in FIG. 16;

FIG. 18 is an example of a connection request packet format;

FIG. 19 is an example of a connection reply packet format;

FIG. 20 is an example of a terminal expel request packet format;

FIG. 21 is an example of a terminal expel request reply packet format;

FIG. 22 is an example of an incoming band increase request packet format;

FIG. 23 is an example of an incoming band increase request reply packet format;

FIG. 24 is an example of an outgoing band decrease notification packet format;

FIG. 25 is an example of an outgoing band decrease notification reply packet format;

FIG. 26 is an example of a terminal accept request packet format;

FIG. 27 is an example of a terminal accept request reply packet format;

FIG. 34 is an example of the configuration of the connection information management table according to the second embodiment;

FIG. 35 is a flowchart of the operation in the distribution path generating process according to the second embodiment.

DESCRIPTION OF EMBODIMENTS

Figure 9:
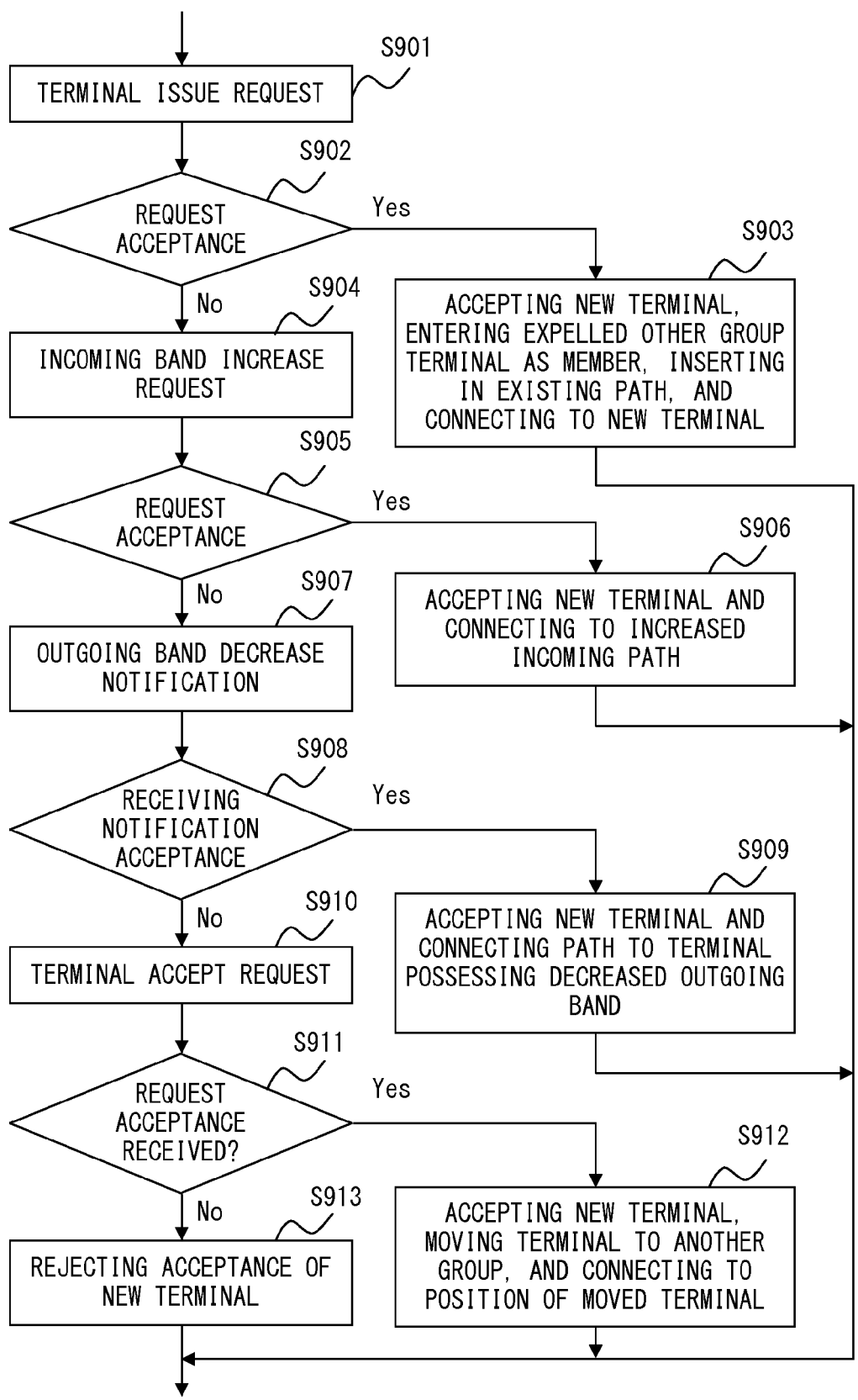
FIG. 9 is a flowchart of the operation in the insufficient band (unstable status) countermeasure request process.

The best mode for embodying the present invention is described below with reference to the attached drawings.

The first and second embodiments described below are based on the streaming distribution system for grouping terminals and transferring data among the terminals.

Description of the Principle of Each Embodiment

First, the condition under which a data distribution path can be correctly wired (configuring a path) in a group is to be clarified. The data distribution path can be constantly wired in the group by maintaining the state in the group to satisfy the condition, and the path can be easily amended, thereby realizing the stability of distribution.

For example, when a condition holding the streaming distribution from a terminal to another terminal is considered, the bandwidth of distributed data B is a demanded bandwidth for a receiving terminal. On the other hand, it is apparent that a streaming transmitting terminal requires distribution performance for transmitting data through the bandwidth B or more. That is, it is the condition of performing the distribution to satisfy the following equation 1. Namely, it is the condition of wiring the distribution path between two terminals.

(distribution performance)−(demand)≥0  [equation 1]

By extending the basics, the possible wiring condition is derived among the grouped terminals. When the equation 1 is extended to the case of the group, the distribution path can be basically generated if the total distribution performance in the group exceeds the total demand in the group.

(total distribution performance)−(total demand)≥0  [equation 2]

However, there are various wiring methods for distribution paths. In the case of a single tree path illustrated in FIG. 3, it can be difficult to perform path wiring although the "total distribution performance" is the total sum of the distribution performance of each terminal. In FIG. 3, the total sum $B_{total}$ of the distribution performance is expressed by the following equation 3 where the distribution performance of the terminal X is represented by B(X) by considering the incoming bandwidth $B_{in}$ using the distribution performance of another group.

$B_{Total}=B(M)+B(a)+B(b)+B(c)+B(d)+B_{in}=7B$  [equation 3]

On the other hand, the total demand is 6B because there are 5 terminals in the group and the distribution bandwidth $B_{out}$ to another group is B. Although the total distribution performance is larger by B, it is not certain that another terminal can be actually connected. When the distribution is performed through a path like a single tree, and although the bandwidth of 0.5B can be distributed from two terminals, it is not certain that the distribution to one terminal can be realized.

Practically, since there is a distributing method for realizing it, it is described with reference to the second embodiment later. However, in the first embodiment described below, it is assumed that the fractions of the bandwidth can be rounded using a distribution path of a single tree. Under the assumption, if the total distribution performance is higher than the total demand, a terminal can be added, and the wiring can be performed.

First Embodiment

The first embodiment based on the above-mentioned principle is described below.

FIG. 1 is the basic configuration of a group management terminal, and FIG. 2 is a basic configuration of a terminal in a group (hereinafter referred to simply as a terminal).

The group management terminal includes a communication control unit 102 for communicating with other terminals, a terminal information management unit 103 for managing the terminal information including the data transfer bands of terminals in the group, and a group band management unit 104 for managing the bands of the group.

First, in the management terminal, a control unit 101 acquires a surplus data transfer performance of other terminals through the communication control unit 102, and stores the surplus in the terminal information management unit 103. The control unit 101 adds up the surplus of the data transfer bandwidths of each terminal stored in the terminal information management unit 103, and stores the sum as a group band in the group band management unit 104. On the other hand, the control unit 101 applies a predetermined condition determinant expression, and performs a calculation as to whether or not the group has surplus transfer capability. For convenience, a group state with surplus capability is referred to as "stable", and a group state without surplus capability is referred to as "unstable".

A predetermined condition determinant expression can be, for example, $$B_{Total}+B_n \geq B_{data} \times N + B_{out} + M \quad \text{[equation 4]}$$

where
$B_{Total}$=(total transfer bandwidth of terminals)
$B_n$=(incoming bandwidth)
$B_{data}$=(bandwidth of distributed data)
N=(number of terminals in the group)
$B_{out}$=(outgoing bandwidth)
M=(determination margin)

The procedure of deriving the equation 4 is described below.

In the present embodiment, the following equation is used as a basic determination to maintain the group state so that the "total distribution performance" in the group can exceed the "total demand" and have a surplus to avoid the state in which the band in the group is short and a distribution path cannot be generated.

$$(\text{total distribution performance})-(\text{total demand}) \geq (\text{determination margin}) \quad \text{[equation 5]}$$

where the "total distribution performance" is defined by the following equation 6.

$$(\text{total distribution performance})=(\text{total transfer bandwidth of terminals})+(\text{incoming bandwidth}) \quad \text{[equation 6]}$$

where "incoming bandwidth" (corresponding to an "incoming band") indicates the bandwidth for which distribution is performed from another group as illustrated in FIG. 4. On the other hand, the "total demand" in the group is defined by the following equation 7.

$$(\text{total demand})=(\text{bandwidth of distributed data}) \times (\text{number of terminals})+(\text{outgoing bandwidth}) \quad \text{[equation 7]}$$

where "outgoing bandwidth" (corresponding to an "outgoing band") refers to the bandwidth from which distribution is performed to another group as illustrated in FIG. 4.

The equation 4 can be derived by the equations 5 through 7. In the first embodiment, the control unit 101 determines the transfer capability of a group on the basis of the equation 4 as a basic determinant expression.

At the determination when a new terminal is added to a group, the control unit 101 acquires the data transfer band possessed by (and, i.e., available to) the new terminal, and a redetermination is performed by the equation 4. When the equation 4 holds, the new terminal is permitted to be added to a group. If the equation does not hold, the new terminal is not permitted to be added.

If the number of terminals in a group has been changed by the addition of a new terminal to a group or the stop of a terminal in the group, or if the transfer bandwidth possessed by the terminals in the group has been changed by a network status or the program use state etc. on a terminal, then the control unit 101 performs a determination by the equation 4. If the determinant expression does not hold, a terminal move request is transmitted to another group management terminal to move a terminal having a smaller transfer bandwidth in the local group to another group, or a terminal having a larger transfer bandwidth of another group to the local group, thereby performing control so that the determinant expression can hold again and maintaining the stable state of the group. Otherwise, the control unit 101 transmits a data transmission support request to another group, thereby increasing the amount of incoming data to the group, performing control so that the determinant expression can hold again, and maintaining the stable state of the group. Otherwise, the control unit 101 transmits a data transmission decrease notification to another group, and suppresses the amount of outgoing data if the notification is accepted, thereby maintaining the stable state of the group.

When the control unit 101 receives a terminal expel request from the local group to another group or a terminal accept request from another group to the local group as a terminal move request, or when it receives an incoming bandwidth increase request or an outgoing bandwidth decrease notification of data, the unit accepts the request if the equation 4 holds and it can hold after the request is accepted.

The operation according to the first embodiment having the above-mentioned configuration is described below with reference to the group of the P2P network configured by a group management terminal and a group member terminal. The present invention can be applied to the streaming distribution by the P2P system, but the following first embodiment is an example relating to the control in a terminal or between the terminals required in group management, but the method of transmitting and receiving streaming data itself is not described in detail.

FIG. 4 is an example of P2P streaming distribution. Terminals in the group transfer received data to downstream terminals on the distribution path, and the distribution to all terminals is performed. In the present embodiment, one of the group member terminals also functions as a group management terminal (terminal M).

The group management terminal M includes the control unit 101, the communication control unit 102, the terminal information management unit 103, and the group band management unit 104 as illustrated in FIG. 1. On the other hand, the group member terminal includes a control unit 201, a communication control unit 202, and a terminal information management unit 203 as illustrated in FIG. 2. The communication control units 102 and 202 communicate with other terminals.

FIG. 5 is an example of the terminal information management table managed by the terminal information management units 103 and 203. There are some methods of managing free bands. In the first embodiment, the band of the streaming-distributed contents, that is, the bandwidth of the distribution path is set as a reference unit of 1. Therefore, the band possessed by a terminal and the band used by a terminal are the quotient obtained by dividing the actual bandwidth (bps (bit per second)) by the contents bandwidth (bps) (the integer value is referred to as a degree). Hereinafter in the present embodiment, the "bandwidth" refers to the degree. The terminal information management table illustrated in FIG. 5 stores an available bandwidth (available possessed bandwidth corresponding to an "available possessed band") for the distribution possessed by a terminal, a bandwidth (bandwidth in use corresponding to a "band in use") being already used in the distribution, and terminal information.

For example, the terminal information about the entry in line 1 of the terminal information management table illustrated in FIG. 5 indicates that the corresponding terminal has the IP (Internet protocol) address of 192.168.10.5, uses the port number 10000, the band used by the terminal in the distribution occupies two bands for distribution contents, and one of the two bands has already been used by the terminal for the distribution. In addition, the terminal information has the group ID of 10 to which the terminal belongs, and the terminal upstream (UP) of the distribution path is expressed by "UP, 192, xx~" and belongs to the group ID=10. Similarly, at the downstream (LW) of the terminal, the terminal expressed by "LW, 192. xx~" is connected and data is relay-distributed to the terminal. Furthermore, the terminal information indicates that the terminal is not a group management terminal but a common terminal.

By referring to the terminal information, it is determined that the UP connected terminal having an ID of another group is a terminal receiving through an incoming band, and it is determined that the LW connected terminal having an ID of another group is a terminal outputting through an outgoing band.

Each piece of terminal information is acquired from the terminal when the terminal is incorporated into a group, and stored in the terminal information management table. Each terminal transmits update information to the management terminal of the local group when a change occurs in the information.

On the other hand, the terminal information management table also holds the information about the terminal belonging to a group different from the group to which the group management terminal belongs. It is the information about another group management terminal grasped by the group management terminal. By holding these pieces of terminal information, the group management terminal knows the IP address of the management terminal of another group, and can perform communications. A management terminal of a group relating to the outgoing/incoming band can be designated if a management terminal having the same ID as the group ID of an UP or LW connected terminal is retrieved as necessary.

FIG. 6 is an example of the group band management table managed by the group band management unit 104. The total available possessed band of each terminal in a group is stored in the "total amount of bandwidths"(corresponding to a "total band"). If there is a distribution path from the outside of a group to the inside of the group, the bandwidth of the path is stored in the "incoming band". If there is a distribution path from the inside of a group to another group, the bandwidth of the path is stored in the "outgoing band". If there is a change in the information stored in the terminal information management table illustrated in FIG. 5, the "total amount of bandwidths" (or "total band" illustrated in FIG. 6) is calculated again. When the "incoming band" and the "outgoing band" are changed, they are calculated again each time.

The maximum value in the transfer band possessed by the terminals in the group is selected as the minimum value of the determination margin M by the equation 4 above as calculated by the equation 8 below.

$$M = \max(\{B_1, B_2, \ldots, B_N\}) \quad \text{[equation 8]}$$

$B_n$=(possessed transfer bandwidth of the n-th terminal)

Thus, although a terminal including the terminal having the largest transfer bandwidth suddenly stops, the (total distribution performance) does not fall below the (total demand). Therefore, it can be a target value to be set as a determination margin M.

On the basis of the above-mentioned management information and the determination condition, the control unit 101 illustrated in FIG. 1 manages the increase/decrease of the terminals in the group. As a basic operation, when the equation 4 does not hold, the number of terminals and the amount of incoming and outgoing data are adjusted so that the determinant expression can hold.

When a new terminal is entered, the control unit 101 of the group management terminal acquires the terminal information from the connection request packet transmitted by the new terminal requesting the entry.

FIG. 18 is an example of the data format of a connection request packet. A connection request packet stores a message type "JoinReq" indicating a connection request, an IP address "IPadrs" of a new terminal, a port number "port", and a possessed band "spec".

The control unit 101 determines the condition of the equation 4 by considering the terminal information as indicated in the operation flowchart illustrated in FIG. 7 (steps S701 and S702). If the condition is satisfied, the status (group state) is "stable" (S703), the entry of the new terminal in the group is admitted (S704). If it is not satisfied, the status is "unstable" (S705), and the entry of the terminal in the group is rejected (S706). If the new terminal is rejected, the control unit 101 can be controlled to be admitted after a corresponding request to another group described below.

FIG. 19 is an example of the data format of a reply packet to a new terminal.

If the condition determination (S802) of the equation 4 does not hold after the band calculation (S801) when a terminal in the group suddenly stops its operation, or the band possessed by a terminal in the group is changed as indicated by the operation flowchart illustrated in FIG. 8, and the status (group state) is unstable (S803), or if a new terminal is to be connected as a new entry and the terminal information about the new terminal is determined for the condition with the above-mentioned consideration according to the operation flowchart illustrated in FIG. 7, and the determination indicates "unstable" (S705), then the control unit 101 requests the group management terminal of another group to solve the problem (S804). On the other hand, if the condition determination (S802) of the equation 4 holds after the band calculation (S801), then the status (group state) is "stable" (S803). FIG. 9 is an operation flowchart of the corresponding request process to the management terminal of another group in step S804).

In this example, it is prioritized to first solve the unstable state problem. First, the control unit 101 transmits a "terminal expel request" for moving the terminal having a number of possessed bands from another group to at least one group management terminal (S901). Another group management terminal can be known from the terminal information management table held by the terminal information management unit 103. The message type "MoveReq", the source management terminal information (Sender info2), the source group ID "GroupID", and the requested terminal performance "ReqSpec" are added to the packet format of the terminal expel request as illustrated in FIG. 20.

Upon receipt of the "terminal expel request reply" packet (having the packet format illustrated in FIG. 21) having the answer of "OK" indicating the approval, the control unit 101 inserts an expelled terminal into the existing path from which a distribution path is branched, and connects the path to a terminal in short of reception band and a new terminal (S902→S903).

FIG. 10 is an example of the state transition of an entry of a new terminal. FIG. 11 illustrates a change of the connection information management table from pre-connection to after-connection when the new terminal is entered.

When the "terminal expel request reply" packet having the answer of "OK" cannot be received, an incoming band attempts to increase an incoming bandwidth. That is, the control unit 101 transmits an "incoming band increase request" (packet format illustrated in FIG. 22) as to whether or not the incoming bandwidth can be increased, that is, there is any terminal having a free transfer band capable of connecting a path to at least one other group management terminal (S902→S904)

If the control unit 101 can receive the "incoming band increase reply" packet (having the packet format illustrated in FIG. 23) having the answer of "OK" in response to the request, the unit generates a distribution path to the terminal in short of the bandwidth or a new terminal from the terminal information (information about the terminal having a free band in Node info=transfer bandwidth) described in the "incoming band increase reply" packet (S905→S906).

FIG. 12 is an example of the state transition of an entry of a new terminal. FIG. 13 illustrates a change of the connection information management table from pre-connection to after-connection when the new terminal is entered.

When the control unit 101 cannot receive any "incoming band increase request" packet having the answer of "OK" from another group management terminal in response to the "incoming band increase request", it transmits the next message "outgoing band decrease notification" (having the packet format illustrated in FIG. 24) (S905→S907). The destination is a group management terminal to which the terminal (Nodel illustrated in FIG. 24) as the destination of data transmitted through the outgoing band. The retrieval of the Nodel can be performed by selecting a terminal other than the local group described as an LW from the terminal information management table (FIG. 5) hold by the terminal information management unit 103.

If the control unit 101 can receive an "outgoing band decrease notification reply" packet (having the packet format illustrated in FIG. 25) having the answer of "OK" in response to the notification, it disconnects the distribution path to the terminal and connects the path to the terminal in short of the bandwidth or the new terminal to be accepted (S908→S909).

FIG. 14 is an example of the state transition of an entry of a new terminal. FIG. 15 illustrates a change of the connection information management table from pre-connection to after-connection when the new terminal is entered.

When the control unit 101 cannot receive any "outgoing band decrease reply" packet having the answer of "OK", it transmits the next message "terminal accept request" (having the packet format illustrated in FIG. 26) to another group management terminal (S908→S910). The terminal information about a terminal having no or small available possessed bandwidth is added to the terminal accept request from the terminal information management table (FIG. 5) held by the terminal information management unit 103. As a destination, an upstream or downstream group management terminal can be retrieved from the terminal information management table (FIG. 5).

If the control unit 101 can receive the "terminal accept request reply" (having the packet format illustrated in FIG. 27) having the answer of "OK" in response to the request, it disconnects the path to the terminal, and connects a terminal in short of the bandwidth or a new terminal (S911→S912). At the "terminal accept request", another group can be requested to access a terminal not capable of normally performing reception due to the shortage of bandwidths or a new terminal itself. If the request is accepted, there is no special change in the local group.

FIG. 16 is an example of the state transition of an entry of a new terminal. FIG. 17 illustrates a change of the connection information management table from pre-connection to after-connection when the new terminal is entered.

If the control unit 101 cannot receive any "terminal accept request reply" having the answer of "OK" in response to the request, then it rejects accepting a new terminal (S913).

Finally, described below is the operation of the control unit 101 when each request or notification is received from another group management terminal on the basis of the processes in steps S901, S904, S907, and S910 illustrated in FIG. 9.

Figure 28:
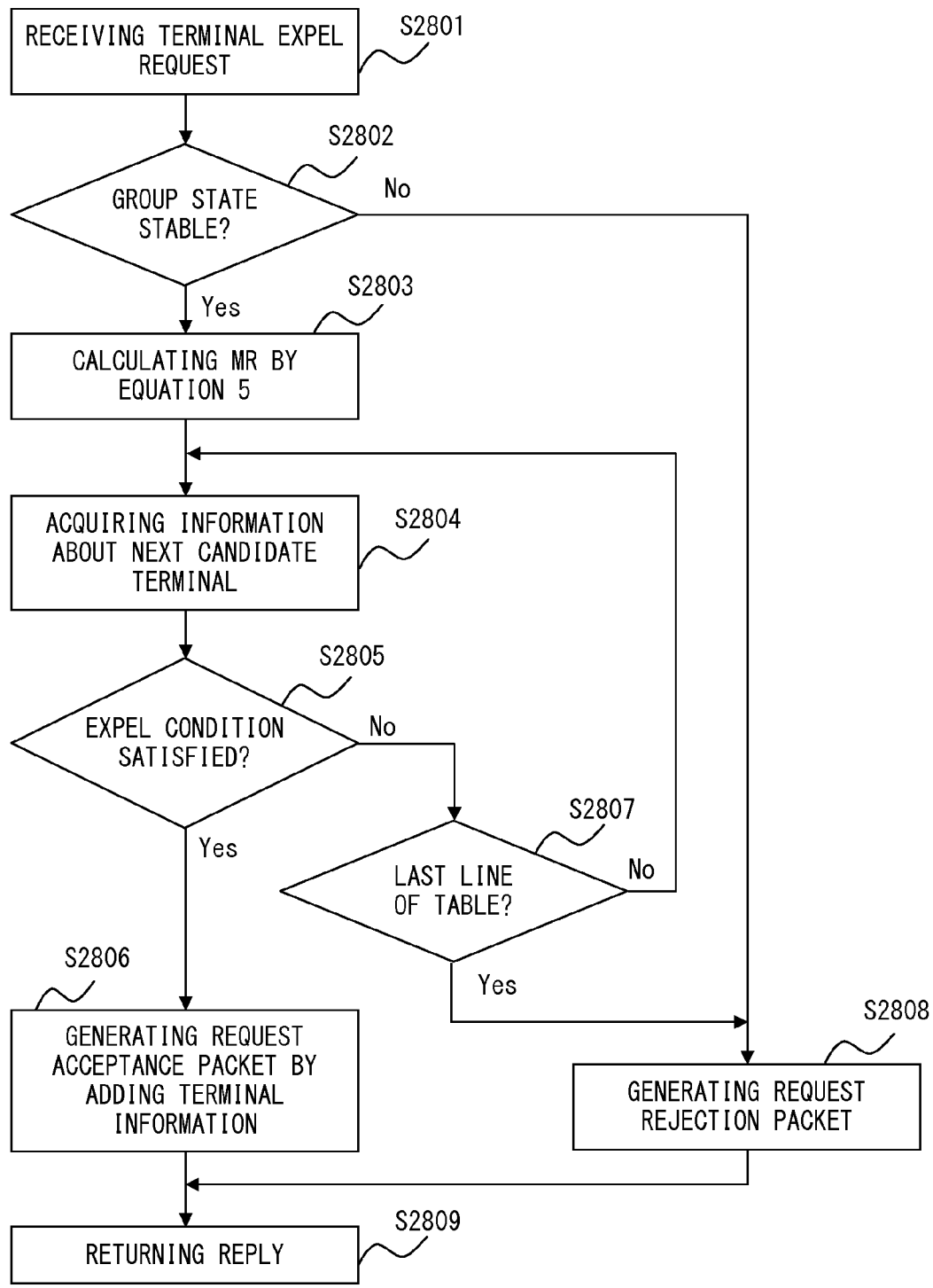
FIG. 28 is a flowchart of the operation of the process performed when a terminal expel request is received.

FIG. 28 is an operation flowchart of the process performed by the control unit 101 of the group management terminal as a receiver of the "terminal expel request" transmitted from another group management terminal in the process in step S901 illustrated in FIG. 9.

Upon receipt of the "terminal expel request" packet (FIG. 20) through the communication control unit 102 (S2801), then the control unit 101 determines whether or not the status of the local group is "stable" (S2802).

If the status of the local group is not "stable", the control unit 101 generates a "terminal expel request reply" packet (FIG. 21) describing "NG" indicating a rejection of the request (S2802→S2808), and returns it to the group management terminal of the requester (S2809).

If the status of the local group is "stable", the control unit 101 calculates a margin $M_R$ for the surplus as a stable state by the equation 9 (S2802→S2803).

$$M_R = B_{Total} + B_{in} - (B_{data} \times N + B_{out} + M)$$ [equation 9]

where $M_R$ indicates a surplus margin of stable state

Then, the control unit 101 retrieves a terminal having the margin $M_R$ or less as the bandwidth obtained by subtracting the "band in use" from the free band, that is, the "available possessed band", and having two or more bands of distributed data in the terminal information management table (FIG. 5) held by the terminal information management unit 103 (repetitive processes in S2804→S2805→S2807→S2804). The terminal information is added to a successfully retrieved terminal as a terminal to be expelled, generates a "terminal expel request reply" packet (FIG. 21) describing "OK" indicating a request to be accepted (S2805→S2906), and the packet is returned to the group management terminal as a source of the request (S2809).

If there is no terminal satisfying the expel condition in the table, the unit generates a "terminal expel request reply" packet (FIG. 21) describing "NG" indicating a rejection of the request (S2807→S2808), and the packet is returned to the group management terminal of the requester (S2809).

Figure 29:
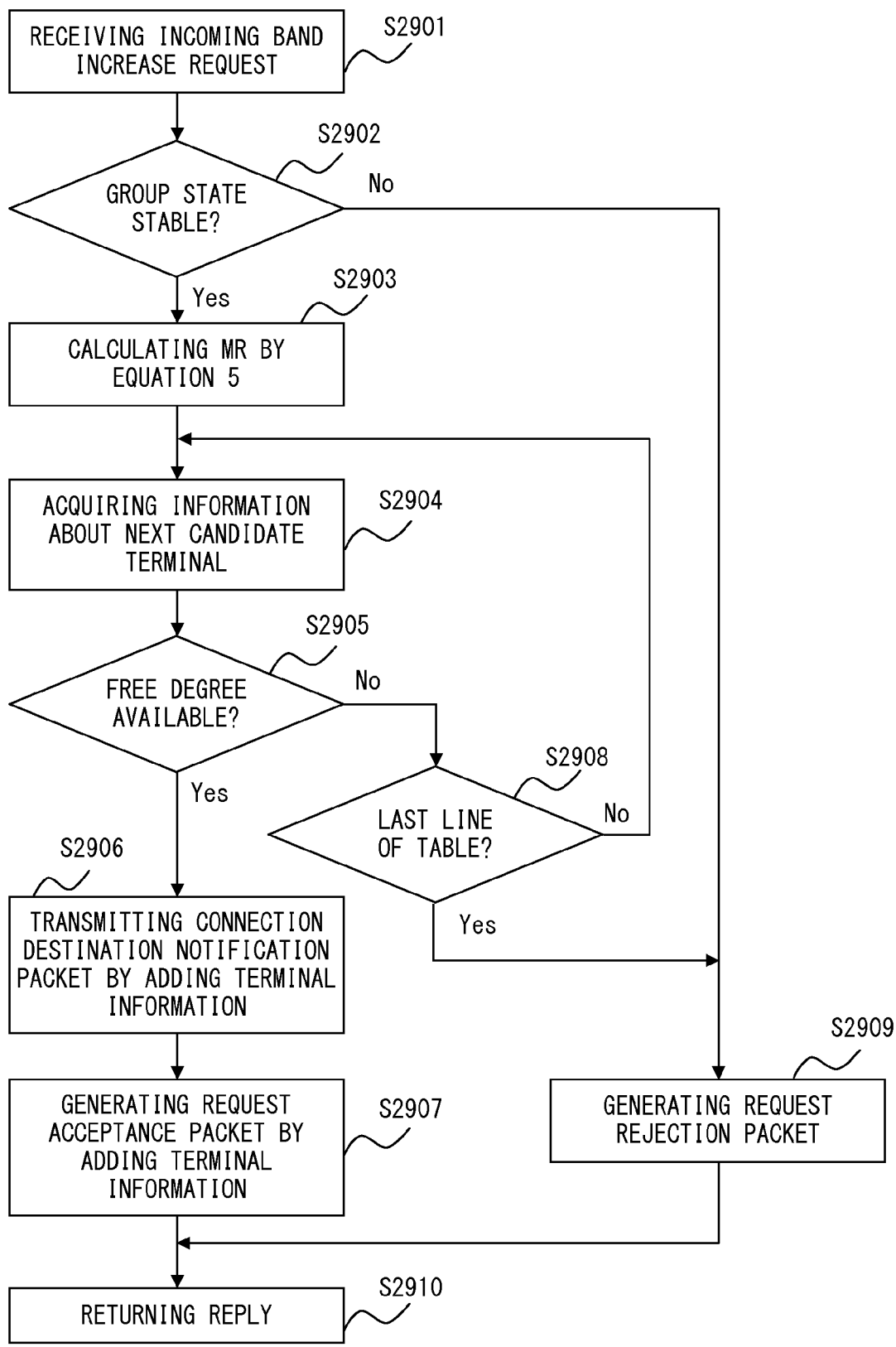
FIG. 29 is a flowchart of the operation of the process performed when an incoming band increase request is received.

FIG. 29 is an operation flowchart of the process performed by the control unit 101 of the group management terminal as a receiver of the "incoming band increase request" transmitted from another group management terminal in the process in step S904 illustrated in FIG. 9.

Upon receipt of the "incoming band increase request" packet (FIG. 22) through the communication control unit 102 (S2901), the control unit 101 determines whether or not the status of the local group is "stable" (S2902).

If the status of the local group is not "stable", the control unit 101 generates a "incoming band increase request reply" packet (FIG. 23) describing "NG" indicating a rejection of the request (S2902 S2909), and returns it to the group management terminal of the requester (S2910).

If the status of the local group is "stable", the control unit 101 calculates a margin $M_R$ for the surplus as a stable state by the equation 9 (S2902→S2903).

Then, if the margin $M_R$ is equal to or larger than the bandwidth of distributed data, the control unit 101 retrieves a terminal having the bandwidth of distributed data or larger as the bandwidth obtained by subtracting the "band in use" from the free band, that is, the "available possessed band", in the terminal information management table (FIG. 5) held by the terminal information management unit 103 (repetitive processes in S2904→S2905→S2908→S2904). The terminal information is added to a successfully retrieved terminal, a connection notification packet is transmitted (S2905→S2906), the terminal is selected as a terminal to which a distribution path can be output to increase the bandwidth, the terminal information is added, a "incoming band increase request reply" packet (FIG. 23) describing "OK" indicating a request to be accepted is generated (S2907), and the packet is returned to the group management terminal as a source of the request (S2910).

If there is no terminal satisfying the expel condition in the table, the unit generates a "terminal expel request reply" packet (FIG. 21) describing "NG" indicating a rejection of the request (S2908→S2909), and the packet is returned to the group management terminal of the requester (S2910).

Figure 30:
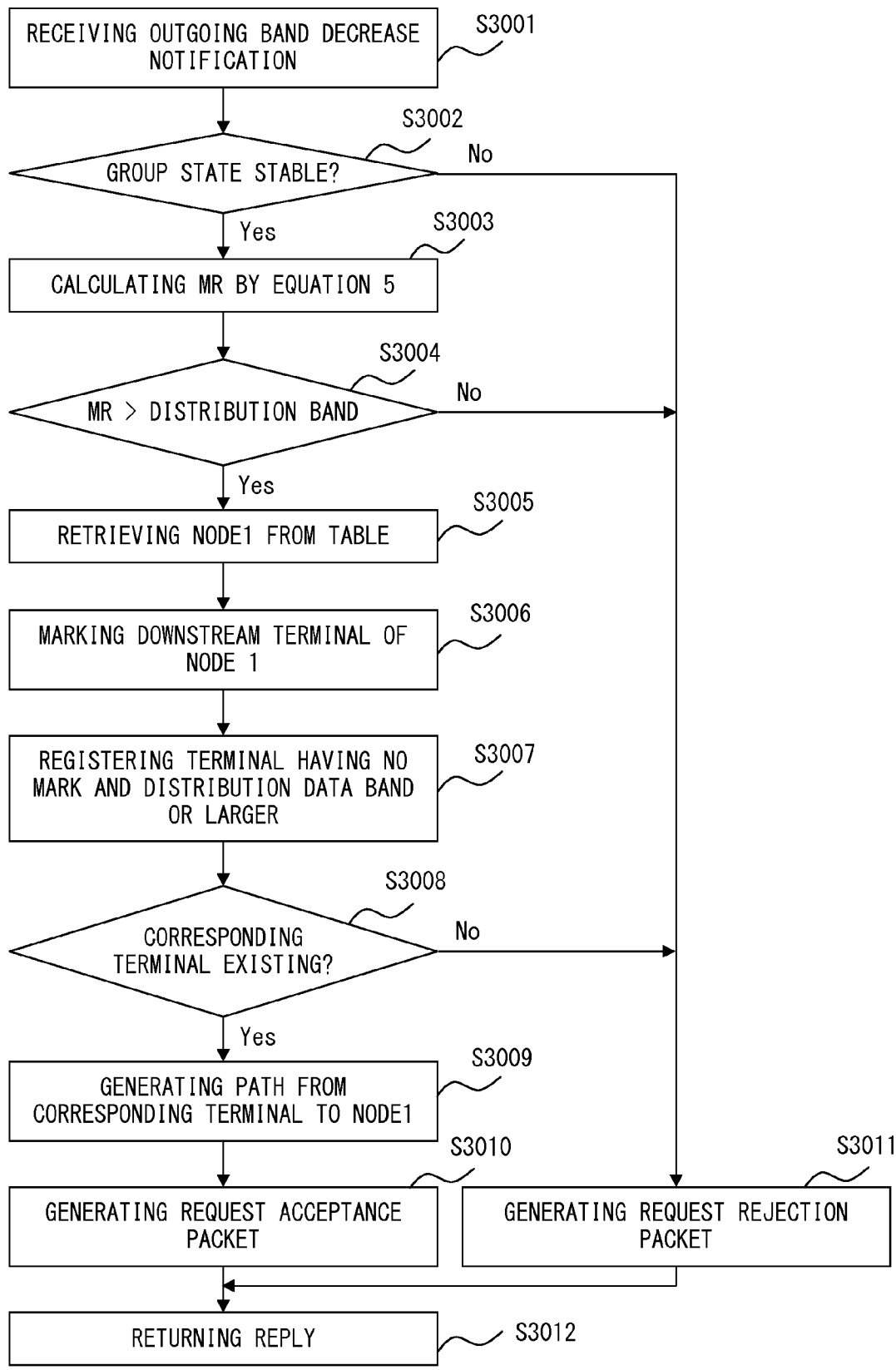
FIG. 30 is a flowchart of the operation of the process performed when an outgoing band decrease notification is received.

FIG. 30 is an operation flowchart of the process performed by the control unit 101 of the group management terminal as a receiver of the "outgoing band decrease notification" transmitted from another group management terminal in the process in step S907 illustrated in FIG. 9.

Upon receipt of the "outgoing band decrease notification" packet (FIG. 24) through the communication control unit 102 (S3001), the control unit 101 determines whether or not the status of the local group is "stable" (S3002).

If the status of the local group is not "stable", the control unit 101 generates an "outgoing band decrease notification reply" packet (FIG. 25) describing "NG" (S3002→S3011), and returns it to the group management terminal of the requester (S3012).

If the status of the local group is "stable", the control unit 101 calculates a margin $M_R$ for the surplus as a stable state by the equation 9 (S3002→S3003).

Then, the control unit 101 determines whether or not the margin $M_R$ is larger than the bandwidth of distributed data.

When the margin $M_R$ is equal to the bandwidth of distributed data or less, the control unit 101 generates an "outgoing band decrease notification reply" packet (FIG. 25) describing "NG" (S3004→S3011), and returns the packet to the group management terminal of the requester (S3012).

If the margin $M_R$ is larger than the bandwidth of distributed data, the path can be amended, and the control unit 101 sets a mark flag for the "marker" area (FIG. 5) of all terminal information entries corresponding to all terminals connected to the downstream of the terminal (Nodel in FIG. 24) notified as a band to be decreased in the terminal information management table (FIG. 5) held by the terminal information management unit 103. In the marking process, the terminal information entry corresponding to the terminal address described in the Nodel is retrieved from the terminal information management table (FIG. 5) (S3005). If a downstream terminal is entered as the LW and the local group in the terminal information entry, then the mark flag is set in each terminal information entry corresponding to each downstream terminal. Each terminal information entry corresponding to the downstream terminal as the LW and the local group is retrieved from each entry, a mark flag is set thereon, and the similar processes are repeated (S3006).

After the above-mentioned marking process, the control unit 101 retrieves a terminal having the bandwidth of distributed data or larger as the bandwidth obtained by subtracting the "band in use" from the free band, that is, the "available possessed band" in the terminal information in which no mark flag is set in the "marker" area in the terminal information management table (FIG. 5) (S3007).

If the terminal is not retrieved, the control unit 101 generates an "outgoing band decrease notification reply" packet (FIG. 25) describing "NG" (S3008→S3011) and returns the packet to the group management terminal of the requester (S3012).

If the terminal is retrieved, the control unit 101 generates a path from the retrieved terminal to the terminal (Nodel in FIG. 24) notified as a target whose bandwidth is to be decreased (S3008→S3009), generates a "outgoing band decrease notification reply" packet (FIG. 25) describing "OK" (S3010), and returns the packet to the group management terminal of the requester (S3012).

Figure 31:
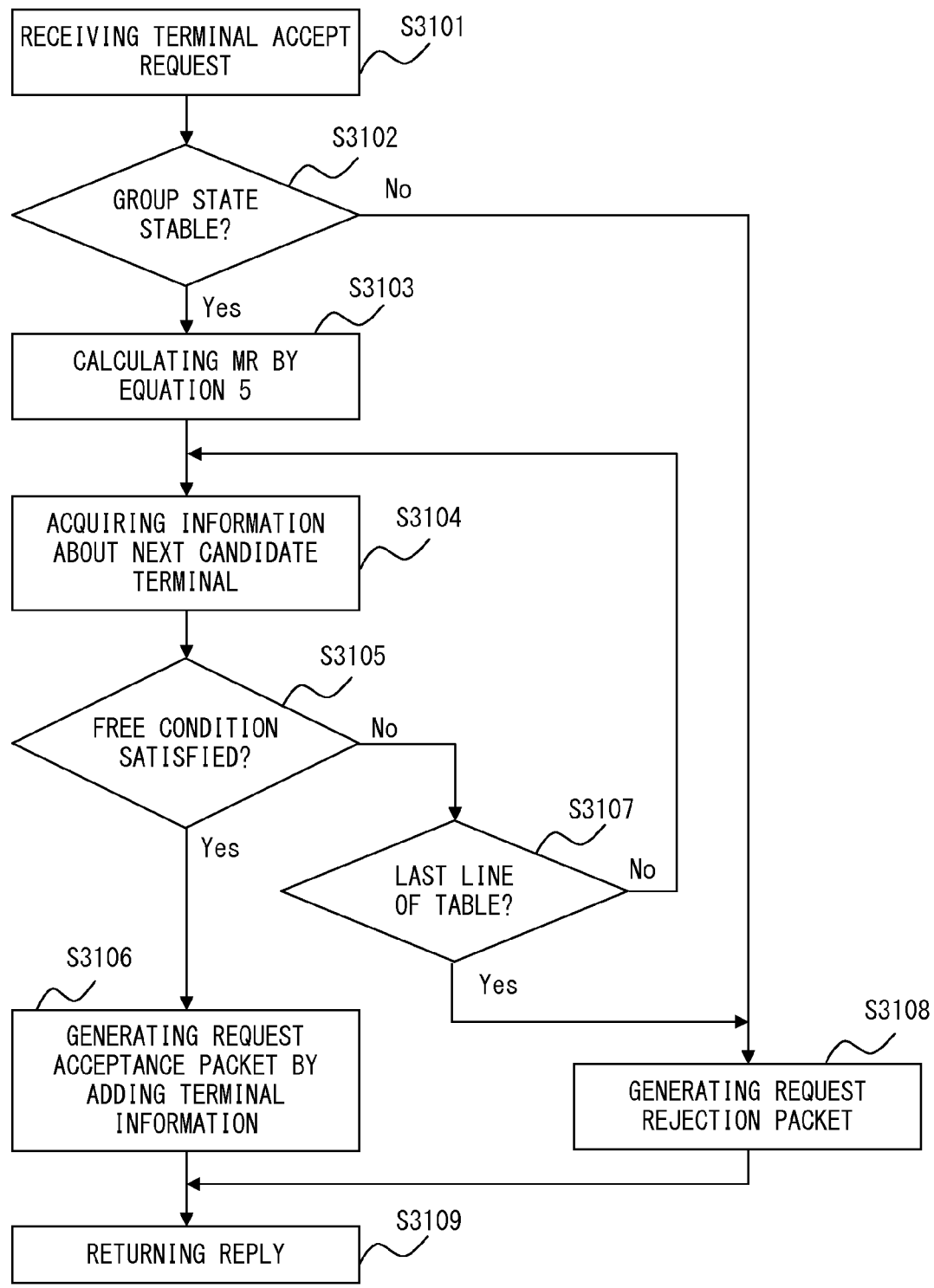
FIG. 31 is a flowchart of the operation of the process performed when a terminal accept request is received.

FIG. 31 is an operation flowchart of the process performed by the control unit 101 of the group management terminal as a receiver of the "terminal accept request" transmitted from another group management terminal in the process in step S910 illustrated in FIG. 9.

Upon receipt of the "terminal accept request" packet (FIG. 26) through the communication control unit 102 (S3101), then the control unit 101 determines whether or not the status of the local group is "stable" (S3102).

If the status of the local group is not "stable", the control unit 101 generates a "terminal accept request reply" packet (FIG. 27) describing "NG" indicating a rejection of the request (S3102→S3108), and returns it to the group management terminal of the requester (S3109).

If the status of the local group is "stable", the control unit 101 calculates a margin $M_R$ for the surplus as a stable state by the equation 9 (S3102 S3103).

Then, if the margin $M_R$ is equal to or larger than the bandwidth of distributed data, the control unit 101 retrieves a terminal having the bandwidth of distributed data or larger as the bandwidth obtained by subtracting the "band in use" from the free band, that is, the "available possessed band", in the terminal information management table (FIG. 5) held by the terminal information management unit 103 (repetitive processes in S3104→S3105→S3107→S3104). If there is a successfully retrieved terminal, the terminal information about the retrieved packet is notified to the terminal of the terminal information added to the request in the connected destination notification packet, a terminal accept request reply packet (FIG. 27) describing "NG" indicating the approval of the request is generated (S3106), and is returned to the group management terminal of the requester (S3109). The terminal information added and returned in the procedure above can also be returned in a list when there are a plurality of terminals satisfying the condition. In this case, any terminal can be selected at the management terminal receiving plural pieces of terminal information as a list.

If there is no terminal satisfying the expel condition in the table, the unit generates a "terminal expel request reply" packet (FIG. 27) describing "NG" indicating a rejection of the request (S3107→S3108), and the packet is returned to the group management terminal of the requester (S3109).

In the first embodiment described above, a message such as a request etc. between terminals is in a predetermined data format, but can also be realized by an IP (Internet protocol) packet etc. in an arbitrary format.

When there are packet group management terminals when a group management terminal transmits various requests and notifications to other group management terminals, the group management terminal can transmit them to the plurality of group management terminals, and when there are a plurality of replies received by the group management terminal, any one can be selected.

Although there are a number of methods for wiring a distribution path, a simple example is described in the present embodiment, and it is obvious that other methods can be applied.

Second Embodiment

In the first embodiment above, the bandwidth in each path between terminals is the same as the bandwidth of distributed data, and the unit of the managed band is based on the bandwidth of distributed data. In the second embodiment, the management is performed on the basis of a narrower band. The basic group managing method is similar to the method according to the first embodiment.

Before starting the description of the second embodiment, a path generating method more efficient than the simple method of wiring the distribution path according to the first embodiment is described first below.

Figure 32:
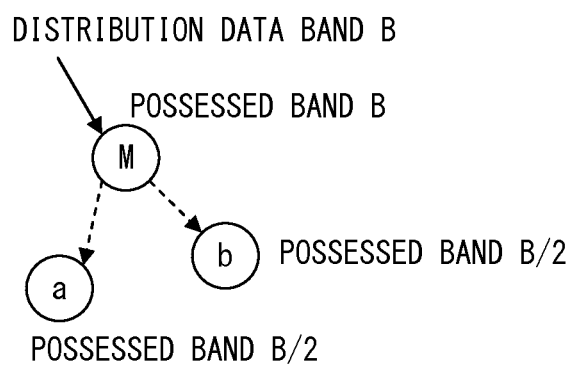
FIG. 32 is an explanatory view of an example of the distribution limit in a single tree-shaped path.

In the wiring method used in the first embodiment, when a terminal has a bandwidth less than the bandwidth of distributed data B (in this example, 0.5B, that is, half the bandwidth B) as for the terminals a and b illustrated in FIG. 32, data cannot be relayed and distributed. Since the terminal M of the possessed bandwidth B can be distributed only one way to the terminal a or b, the other terminal cannot receive data.

Figure 33:
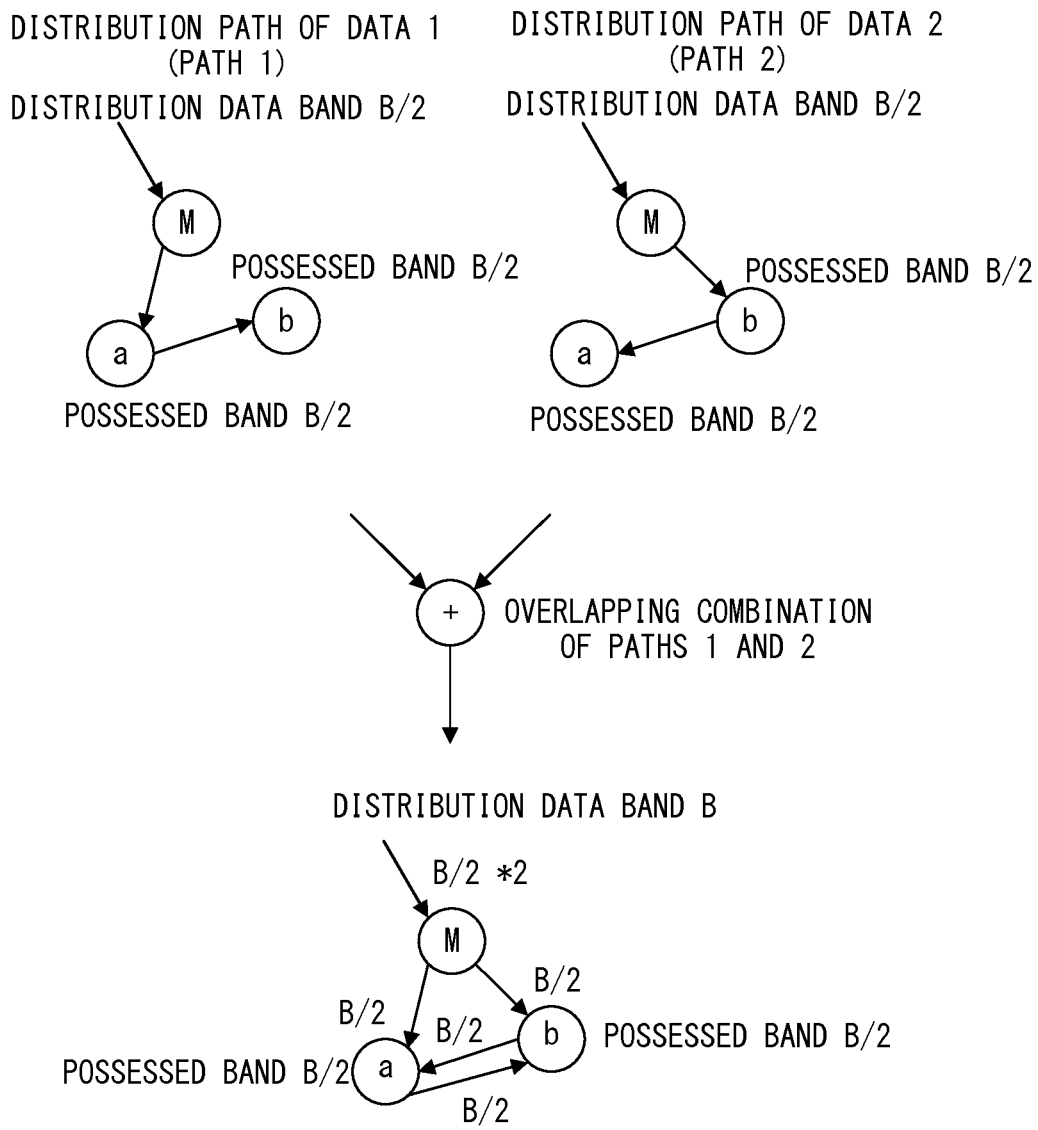
FIG. 33 is an explanatory view of an example of the distribution path configuring method using a plurality of paths.
Figure 36:
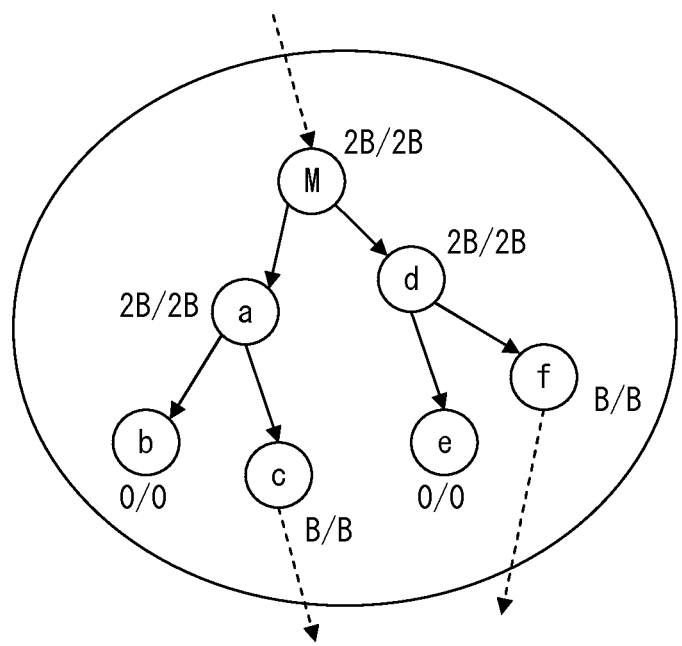
FIG. 36 is an example of a distribution path in a group as a part of the relay distribution system by a P2P.

On the other hand, as illustrated in FIG. 33, the distribution data requiring the bandwidth B is halved, and the data is simultaneously distributed through two distribution paths of 0.5B respectively. For example, the distribution data is divided into unit data, halved into two groups alternately in the sequence of time axis, and each group is defined as data 1 and 2. Since each of the data 1 and 2 is half the original data in amount of data, the distribution bandwidth is also half (0.5B). Assuming that the distribution path of the data 1 is path 1, and the distribution path of the data 2 is path 2, and the terminals a and b respectively receive the data 1 and 2 by 0.5B from two different paths 1 an 2, all data can be received after all, and the original data can be reconstructed if the data is alternately combined sequentially on the time axis. Described below is the second embodiment of the present invention applied with respect to the distribution path configuring method using a plurality of paths above.

Described below is the case in which the bandwidth of distributed data B is divided into two portions and distributed through two paths.

First, the basic configuration of the group management terminal and the basic configuration of a terminal in the group (hereinafter referred to simply as a terminal) are the same as the configurations illustrated in FIGS. 1 and 2.

Each terminal notifies a group management terminal of a quotient obtained by dividing the actual possessed bandwidth by 0.5B as a possessed band. The entry information in the management table is also represented by the quotient obtained by dividing it by 0.5B, and the terminal information management tables held in the terminal information management unit 103 (FIG. 1) and the terminal information management unit 203 (FIG. 2) are as illustrated in FIG. 34. The UP1 and UP2 are upstream terminals in the paths 1 and 2, and similarly the LW1 and LW2 are downstream terminals in the paths 1 and 2 respectively.

When the path is wired, the control unit 101 first determines whether or not the status of the local group is "stable" as illustrated in FIG. 35 (S3501).

If the status of the local group is not "stable", the control unit 101 returns a result of "nonconnectable" (S3501→S3511).

If the status of the local group is "stable", the control unit 101 resets the path number to 0 in step S3502, registers the terminal information (other than connected terminal) about the terminal X in the terminal information management table held by the terminal information management unit 103 in step S3503, increases the path number by +1 in step S3504, retrieves a terminal having a free degree from the management table (S3505) until it determines (in step S3509) that n has reached the number of divisions (=2 in the second embodiment), enters the terminal as a connected terminal to the terminal X as the UPn in the terminal information entry of the terminal X (S3506), decreases the available possessed bandwidth (FIG. 5) after entering the terminal X in the LWn of the terminal information entry of the terminal (S3507), and instructs the corresponding terminal and the terminal X to be mutually connected (S3508), thereby repeating the controlling process.

In the present embodiment, the method of configuring the path in which the bandwidth of distributed data is halved is described, but a similar controlling operation can be applied when the band is divided into N divisions as in the operation flowchart illustrated in FIG. 35.

Furthermore, it can also be applied to a method in which a plurality of paths are not equally divided, and a similar controlling operation is applied using the narrowest band in the plurality of paths as a basic unit. If the bands are not equally divided, the band of each path can generate no redundant band when each band is a multiple of the minimum band, thereby realizing an efficient operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A network group management system in a streaming distribution system for grouping terminal devices and transferring data in real time among the terminal devices, the network group management system including a group management terminal device for grouping and managing terminal devices, the group management terminal device comprising:
 a processor that performs a process including
  a communication control process that collects terminal information including a data transfer bandwidth relating to each terminal device in a local group from each terminal device;
  a terminal information management process that holds the collected terminal information;
  a group band management process that holds total sum of data transmission bandwidth held by each terminal device in the local group according to the collected terminal information; and
  a control process that performs management of an entry of a new terminal device into the local group and that performs connection management of each terminal device in the local group by using a relationship among bandwidths of distributed data in real time in the local group, an incoming data bandwidth from the local group, and an outgoing data bandwidth from the local group according to the terminal information held by the terminal information management device and total sum of the data transmission bandwidths held by the group band management device, wherein the relationship is a magnitude relation between a value which is added a total sum of transfer bandwidths of terminals to the incoming data bandwidth from another group to the local group and a value which is a sum of a value obtained by multiplying the bandwidth of distributed data in the local group by a number of the terminal devices in the local group, the outgoing data bandwidth from the local group, and a predetermined determination margin.

2. The system according to claim 1, wherein the control device uses the relationship by considering information about a terminal device requesting an addition to the local group, and permits the addition of the terminal device requesting the addition to the local group on a basis of a performance result.

3. The system according to claim 1, wherein the control device moves a terminal device between the local group and other groups by transmitting a terminal move request to the other groups when it is determined that an increase or decrease of a connection of each terminal device is not permitted as a result of the comparing and determining process.

4. The system according to claim 1, wherein the control device controls an amount of incoming data or an amount of outgoing data for the local group by transmitting a data transmission support request or a data transmission decrease notification to other groups when it is determined that an increase or decrease of a connection of each terminal device is not permitted as a result of the comparing and determining process.

5. The system according to claim 3, wherein the control device uses the relationship by considering information about a request or a notification when the terminal move request, a data transmission support request, or a data transmission decrease notification is received from the other groups, and determines whether or not the request or the notification is accepted on a basis of a performance result.

6. A method of a network group management system, which includes a group management terminal device for grouping and managing terminals, in a streaming distribution system for grouping the terminal devices and transferring data in real time among the terminal devices, comprising:

collecting terminal information including a data transfer bandwidth relating to each terminal device in a local group from each terminal device;

holding the collected terminal information;

holding total sum of data transmission bandwidths held by each terminal device in the local group from the collected terminal information; and performing management of an entry of a new terminal device into the local group and connection management of each terminal device in the local group by using a relationship among bandwidths of distributed data in real time in the local group, an incoming data bandwidth to the local group, and an outgoing data bandwidth from the local group according to the terminal information held in step of holding the collected terminal information and total information about the data transmission bandwidth held in the step of holding total sum of data transmission bandwidths, wherein the relationship is a magnitude relation between a value inch is added a total sum of transfer bandwidths of terminals to the incoming data bandwidth from another group to the local group and a value which is a sum of a value obtained by multiplying the bandwidth of distributed data in the local group by a number of the terminal devices in the local group, the outgoing data bandwidth from the local group, and a predetermined determination margin.

7. The method according to claim 6, wherein the performing step uses the relationship by considering information about a terminal device requesting an addition to the local group, and permits the addition of the terminal device requesting the addition to the local group on a basis of a performance result.

8. The method according to claim 6, wherein the performing step moves a terminal device between the local group and other groups by transmitting a terminal move request to the other groups when it is determined that an increase or decrease of a connection of each terminal device is not permitted as a result of the comparing and determining process.

9. The method according to claim 6, wherein the performing step controls an amount of incoming data or an amount of outgoing data for the local group by transmitting a data transmission support request or a data transmission decrease notification to other groups when it is determined that an increase or decrease or a connection of each terminal device is not permitted as a result of the comparing and determining process.

10. The method according to claim 8, wherein the performing step uses the relationship by considering information about a request or a notification when the terminal move request, a data transmission support request, or a data transmission decrease notification is received from the other groups, and determines whether or not the request or the notification is accepted on a basis of a performance result.

* * * * *